US006892178B1

(12) United States Patent
Zacharia

(10) Patent No.: US 6,892,178 B1
(45) Date of Patent: May 10, 2005

(54) METHOD AND SYSTEM FOR ASCRIBING A REPUTATION TO AN ENTITY FROM THE PERSPECTIVE OF ANOTHER ENTITY

(75) Inventor: Giorgos C. Zacharia, Lakatamia (CY)

(73) Assignee: Open Ratings Inc., Waltham, MA (US)

( * ) Notice: Subject to any disclaimer, the term of this patent is extended or adjusted under 35 U.S.C. 154(b) by 335 days.

(21) Appl. No.: 09/709,989

(22) Filed: Nov. 10, 2000

Related U.S. Application Data
(60) Provisional application No. 60/209,059, filed on Jun. 2, 2000.

(51) Int. Cl.[7] .............................................. G06F 17/60
(52) U.S. Cl. ................................ 705/10; 705/7; 705/8; 705/9
(58) Field of Search ............................... 705/7, 8, 9, 10

(56) References Cited

U.S. PATENT DOCUMENTS

| | | | | |
|---|---|---|---|---|
| 4,870,579 A | * | 9/1989 | Hey | 364/419 |
| 4,996,642 A | * | 2/1991 | Hey | 364/419 |
| 5,550,746 A | | 8/1996 | Jacobs | |
| 5,732,400 A | | 3/1998 | Mandler et al. | |
| 5,768,142 A | | 6/1998 | Jacobs | |
| 6,073,117 A | | 6/2000 | Oyanagi et al. | |
| 6,112,186 A | * | 8/2000 | Bergh et al. | 705/10 |
| 6,249,785 B1 | | 6/2001 | Paepke | |
| 6,275,811 B1 | * | 8/2001 | Ginn | 705/10 |
| 6,347,332 B1 | * | 2/2002 | Malet et al. | 709/205 |
| 6,362,837 B1 | * | 3/2002 | Ginn | 345/751 |
| 6,487,541 B1 | * | 11/2002 | Aggarwal et al. | 705/26 |
| 6,708,155 B1 | | 3/2004 | Honarvar et al. | |
| 2001/0034631 A1 | | 10/2001 | Kiselik | |

OTHER PUBLICATIONS

Zacharia, Giorgos et al. Collaborative Reputation Mechanisms in Electronic Marketplace. Proceedings of the 32nd Hawaii International Conference on System Sciences, Jan. 1999.*

Priluck, Jill. MIT: E–Commerce Just Beginning. Wired News, www.wired.com, Feb. 24, 1999.*

Moukas, Alexandros et al. Agent–mediated Electronic Commerce: An MIT Media Laboratory Perspective. From ICEC98 Submision. http//moux.www.media.mit.edu/people/moux/.*

Moukas, Alexandros et al. Agent–mediated Electronic Commerce: An MIT Media Laboratory Perspective.*

N. Cesa–Bianchi, et al., "How to Use Expert Advice", Journal of the ACM, vol. 44(3), pp. 427–485, May 1997.

C. Dellarocas, "Immunizing Online Reputation Reporting Systems Against Unfair Ratings and Discriminatory Behavior", Proceedings of the $2_{nd}$ ACM Conference on Electronic Commerce, Minn. MN, Oct. 17–20, 2000.

J. Donath et al., "Identity and Deception in the Virtual Community", 1998, pp. 1–32.

(Continued)

*Primary Examiner*—Tariq R. Hafiz
*Assistant Examiner*—Johnna Stimpak
(74) *Attorney, Agent, or Firm*—Wolf, Greenfield & Sacks, P.C.

(57) ABSTRACT

A personalized ratee reputation of a first entity from the perspective of a second entity is determined. The second entity is connected by one or more rating paths to the first entity. A breadth-first search is performed, beginning at the second entity, to determine, from the one or more rating paths, one or more first rating paths that have a first length equal to a shortest length between the first entity and the second entity. For each determined first rating path, a third entity on the first rating path that has a level equal to one less than the first length is identified. For each identified third entity, a first rating of the first entity provided by the third entity determined, and the first ratings are combined. The personalized ratee reputation is then produced by weighting the combined first ratings by an amount according to the first length.

28 Claims, 19 Drawing Sheets

OTHER PUBLICATIONS

EBay Services: The Feedback Forum; http://pages.ebay.com/services/forum/feedback.html.

Epinions.com—FAQs: The Web of Trust, http://www.epinions.com/help/faq;.

Y. Freund, et al., "Using and Combining Predictors that Specialize", in Twentyninth Annual ACM Symposium on Theory of Computing, 1995.

E. J. Friedman et al, The Social Cost of Cheap Pseudonyms: Fostering Cooperation on the Internet, Proceedings of the 1998 Telecommunications Policy Research Conference.

L. E. Foner, "Yenta: A Multi–Agent, Referral–Based Matchmaking System", First International Conference on Autonomous Agents (Agents'97), Feb., 1997.

E. Glickman, Paired Comparison Models with Time–Varying Parameters, Ph.D. Thesis, Harvard University, May 1993.

M. Herbster et al., "Tracking the Best Expert", Journal of Machine Learning, vol. 32(2), Aug. 1998.

Internet Content Rating Association, web pages at http://www.rsac.org., Sep. 17, 2001.

R. Khare et al., "Weaving a Web of Trust", Summer of 1997, Issue of the World Wide Web Journal, vol. 2, No. 3, pp. 77–112.

P. Kollock, "The Production of Trust in Online Markets, Advances in Group Processes", vol. 16, 1999.

H. Madsen et al., "Lecture Notes in Non–linear and Non-stationary Time Series Analysis", Institute of Mathematical Modelling (IMM), 1998, Chapter 9, pp. 193–208.

S. P. Marsh, "Formalising Trust as a Computational Concept", Ph.D. Thesis, University of Stirling, Apr. 1994.

J. M. Reagle, Jr., "Trust in a Cyptographic Economy and Digital Security Deposits: Protocols and Policies", Master Thesis, MIT, May 1996.

P. Resnick, et al., "GroupLens: An Open Architecture for Collaborative Filtering of Netnews", Proceedings of ACM 1994 Conference on Computer Supported Cooperative Work, pp. 175–186.

P. Resnick et al., "Trust Among Strangers in Internet Transaction: Empirical Analysis of eBay's Reputation System", Working Paper for the NBER Workshop on Empirical Studies of Electronic Commerce, pp. 1–26.

U. Shardanand et al., "Social Information Filtering: Algorithms for Automating Word of Mouth", Proceedings of the CHI–95 Conference, Denver, CO, May 1995, pp. 1–12.

G. Zacharia et al., "Dynamic Pricing in a Reputation–Brokered Agent–Mediated Marketplace", International Journal of Intelligent Systems in Accounting, Finance and Management, Special Issue on Agents, vol. 9, (4) pp. 271–286, Dec. 2000.

G. Zacharia, "Collaborative Reputation Mechanisms for Online Communities", MIT Program of Media Arts and Sciences, School of Architecture and Planning, Aug. 6, 1999.

MyFICO—Your Source for Credit Scoring, web pages at http://www.myfico.com, Sep. 5, 2001.

Better Business Bureau, Fairness in the Marketplace, web pages at http://search.bbb.org, Sep. 5, 2001.

* cited by examiner

METHOD AND SYSTEM FOR ASCRIBING A REPUTATION TO AN ENTITY FROM THE PERSPECTIVE OF ANOTHER ENTITY

RELATED APPLICATIONS

This application claims priority under 35 U.S.C. §119(e) to commonly-owned, co-pending U.S. provisional patent application Ser. No. 60/209,059, entitled, Determining a Reputation of an Entity, filed Jun. 2, 2000, which is herein incorporated by reference in its entirety.

Further, each of the following related commonly-owned U.S. patent applications: U.S. application Ser. No. 09/710,008, titled "Method and System for Ascribing a Reputation to an Entity as a Rater of Other Entities" by Giorgos Zacharia and Dmitry Tkach, U.S. application Ser. No. 09/710,498, titled "System and Method for Estimating the Impacts of Multiple Ratings on a Result" by Giorgos Zacharia, U.S. application Ser. No. 09/710,011, titled "System and Method for Ascribing a Reputation to an Entity" by Giorgos Zacharia, and U.S. application Ser. No. 09/710,289, titled "System and Method for Recursively Estimating a Reputation of an Entity" by Giorgos Zacharia, each application filed on Nov. 10, 2000, is herein incorporated by reference in its entirety.

BACKGROUND OF THE INVENTION

The emergence of the Internet and other large networks has increased both the number and kinds of electronic exchanges between entities. As used herein, an electronic exchange is any exchange between two or more entities over an electronic network (i.e., not in person) such as, for example, a voice communications network (e.g., POTS or PBX) or a data communications network (e.g., LAN or the Internet) or a voice-and-data communications network (e.g., voice-over-IP network). Electronic exchanges may include electronic business transactions and electronic communications. Such electronic business transactions may include the negotiation and closing of a sale of goods or services, including solicitation of customers, making an offer and accepting an offer. For example, in consumer-to-consumer electronic marketplaces (e.g., the eBay, OnSale, Yahoo and Amazon marketplaces found on the global Internet, entities may transact for the sale and purchase of goods or services.

Electronic communications also may include communications in on-line communities such as mailing lists, news groups, or web-based message boards and chat rooms, where a variety of sensitive personal information may be exchanged, including health-related data, financial investment data, help and advise on research and technology-related issues, or even information about political issues. As referred to herein, an entity may be a person or an electronic agent (e.g., a software agent). Such a person may Act as an individual (i.e., on the person's own behalf) or as a representative (e.g., officer or agent) of a corporation, partnership, agency, organization, or other group. An electronic agent may act as an agent of an individual, corporation, partnership, agency, organization, or other group.

In many electronic exchanges, an entity's identity may be anonymous to another entity. This anonymity raises several issues regarding trust and deception in connection to these exchanges. For example, an anonymous entity selling goods on-line may misrepresent the condition or worth of a good to a buyer without suffering a loss of reputation, business or other adverse effect, due to the entity's anonymity.

One solution to the problems regarding trust and deception is to provide a reputation mechanism to determine and maintain a reputation or reliability rating of an entity. Typically, a reputation mechanism is intended to provide an indication of how reliable an entity is, i.e., how truly its actions correspond to its representations, based on feedback by other entities that have conducted an electronic exchange with the entity. Such feedback typically is provided by another entity in the form of ratings in a numerical (e.g., 1–5) or Boolean (e.g., good or bad) form. In some reputation mechanisms, an average of the ratings provided by other entities are calculated to produce the reputation rating of the entity. Consequently, such reputation mechanisms typically represent the reputation of an entity with a scalar value.

Typical reputation mechanisms suffer from susceptibility to frauds or deceptions. For example, a first typical fraud occurs when an anonymous entity, after developing a poor reputation over time in an on-line community, reenters the community with a new anonymous identity (i.e., on-line name), thereby starting anew with a higher reputation than the entity's already earned poor reputation. A second typical fraud, to which typical reputation mechanisms are susceptible, occurs when two or more entities collude to provide high ratings for each other on a relatively frequent basis, such that the reputations of these entities are thereby artificially inflated.

Two reputation mechanisms that solve these two problems, Sporas and Histos, are disclosed in "Collaborative Reputation Mechanisms for On-line Communities" by Giorgos Zacharia, submitted to the Program of Media Arts and Sciences, Massachusetts Institute of Technology, Cambridge, Mass. published September, 1999 (hereinafter "the Zacharia thesis"), the contents of which are herein incorporated by reference.

Sporas is a reputation mechanism for loosely-connected communities (i.e., one in which many entities may not have had an electronic exchange with one another and thus not have rated one another.) According to the Sporas technique, a reputation may be calculated for an entity by applying the following equation:

$$R_i = R_{i-1} + \frac{1}{C} \cdot damp(R_{i-1}) R_i^{other}(W_i - E_i), \qquad \text{Equation 1:}$$

where $R_{i-1}$ is the initial reputation of the entity, C is an effective number of ratings, 1/C is the change rate factor, named as such because it impacts the rate at which the reputation changes, damp $(R_{i-1})$ is a damping function, $R_i^{other}$ is the reputation of another entity providing the rating, $W_i$ is the rating of the entity provided by the other entity, $E_i$ is the expected value of the rating and $R_i$ is the reputation of the entity.

Zacharia discloses that the damping function may be calculated by applying the following equation:

$$damp(R_{i-1}) = 1 - \frac{1}{1 + e^{\frac{-(R_{i-1}-D)}{a}}}, \qquad \text{Equation 2:}$$

where D is the size of the range of allowed reputation values and a is a so-called "acceleration" factor. The acceleration factor is named as such because its value controls a rate at which an entity's reputation changes. The Zacharia thesis further discloses that an expected rating, $E_i$ can be calculated from the following equation:

$$E_i = \frac{R_{i-1}}{D}.$$ Equation 3:

(Throughout this application, if a value represented by a symbol from a current equation was described in connection with a previously-described equation, the description of the value will not be repeated for the current equation.)

The Sporas technique implements an entity reputation mechanism based on the following principles. First, new entities start with a minimum reputation value, and build-up their reputations as a result of their activities on the system. For example, if a reputation mechanism has a rating range from 1 to 100, then an entity may start with an initial reputation value, $R_0$, of 1. By starting with the minimum reputation value, Sporas reduces the incentive to, and effectively eliminates, that ability of an entity with a low reputation to improve the entity's reputation by reentering the system as a new anonymous identity.

Second, the reputation of an entity never falls below the reputation of a new entity. This may be ensured by applying equation 1 above. This second principle also reduces the incentive, and effectively prevents, an entity with a low reputation from reentering the system as a new anonymous entity.

Third, after each electronic exchange, the reputations of each of the two or more entities involved are updated according to the feedback or ratings provided by the other entities, where the feedback or ratings represent the demonstrated trustworthiness of the two or more entities in the latest exchange. For example, referring to Equation 1 above, the ratee reputation $R_i$ of an entity is updated for each new rating, $W_i$.

Fourth, two entities may rate each other only once. If two entities exchange more than once, then, for each entity, the reputation mechanism only applies the most recently submitted rating to determine the reputation of the rated entity. This fourth principle prevents two or more entities from fraudulently inflating their reputations, as describe above, by frequently rating each other with artificially high ratings.

Fifth, entities with very high reputation values experience smaller rating changes after each update. This fifth principle is implemented by the damping function, damp($R_{i-1}$), of Equations 1 and 2 above. The damping function, increases as the ratee reputation of the rated entity decreases, and decreases as the ratee reputation of the rated entity increases. Thus, a high reputation is less susceptible to change by a single poor rating provided by another entity.

Sixth, the reputation mechanism adapts to changes in an entity's behavior. For example, a reputation may be discounted over time so that the most recent ratings of an entity have more weight in determining the ratee reputation of the entity. For example, in Equation 1, above, ratings are discounted over time by limiting the effective number of ratings considered, C.

The Sporas reputation mechanism also weights the reputation of a rated entity according to the reputation, $R^{other}$, of another entity providing the rating, where this reputation of the other entity may be determined by applying Equation 1. Therefore, ratings from entities having relatively higher reputations have more of an impact on the reputation of the rated entity than ratings from entities having relatively lower reputations.

As described in the Zacharia thesis, Histos is a reputation mechanism better-suited for a highly-connected community, where entities have provided ratings for a significant number of the other entities. Histos determines a personalized reputation of a first entity from a perspective of a particular entity.

Histos represents the principle that a person or entity is more likely to trust the opinion of another person or entity with whom she is familiar than trust the opinion of another person or entity who she does not know. Unlike Sporas, a reputation of a first entity in Histos depends on the second entity from whose perspective the determination is made, and other ratings of the second entity provided by other users in an on-line community or population.

FIG. 1 is a block diagram illustrating a representation of an on-line community or population 300 of entities $A_1$–$A_{11}$. It interconnected by several rating links, including rating links 302, 303, 304, 306, 308 and 310. Each rating link indicates a rating of a rated entity (i.e., a ratee) by a rating entity (i.e., a rater) with an arrowhead pointing from the rating entity to the rated entity. As used herein, a ratee is an entity in a position of being rated by one or more other entities, and a rater is an entity in a position of rating one or more other entities. For example, rating link 302 represents a rating of 0.8 for ratee $A_3$ by rater $A_1$, and rating link 303 represents a rating of 0.9 for ratee $A_1$ by rater $A_3$.

Although in FIG. 1, each rating link only indicates a single rating, it is possible that an entity has provided more than one rating for another entity. The Zacharia reference discloses that if an entity has provided more than rating for another entity, the most recent rating should be selected to determine a personalized reputation of a first entity from the perspective of a second entity.

To determine a personalized reputation of a first entity from the perspective of a second entity, the first and second entity must be "connected". A first and second entity are connected if a rating path connects the first and second entity. A rating path is a series of rating links that connect a first entity to a second entity. For example, in FIG. 1, entities $A_1$ and $A_{11}$ are connected by several rating paths, including rating paths 312 and 314. Rating path 312 includes rating links 302, 304 and 310, and rating path 314 includes rating links 302, 306 and 308.

As described in the Zacharia thesis, and referring to FIG. 1, to determine a personalized reputation of a first user from the perspective of a second user, the following methodology may be applied. First, a breadth-first search algorithm is applied to find all of the rating paths connecting $A_1$ to $A_{11}$ that are of a length less than or equal to a specified value. If a rating link indicates more than one rating, then the most recent rating is selected for the determination of the personalized reputation.

The number of rating links included in a rating path is referred to herein as the "length" of the rating path. For example, the rating path 312 has a length=3 because it includes three rating links 302, 304 and 310. Further, an entity included along a rating path between the first rated entity and the second rating entity has a "level" equal to a number of links between the entity and the second entity. For example, in FIG. 1, the entity $A_8$ is disposed along the rating path 314. The entity $A_8$ has a level 2 in the context of the rating path 314 because two rating links 302 and 306 lie between the entity $A_8$ and the second entity $A_1$. Further, an entity having a level, L, may be said to be a distance L away from the second entity.

Accordingly, the personalized reputation of a first entity from the perspective of a second entity may be determined by application of the following equation:

Accordingly, the personalized reputation of a first entity from the perspective of a second entity may be determined by application of the following equation:

$$R_k(n) = \frac{D \cdot \sum [R_j(n-1) \cdot W_{jk}(n)]}{\sum R_j(n-1)}, \quad \text{Equation 4:}$$

where $R_k(n)$ is the personalized ratee reputation of an entity k from a perspective of a second entity a distance n from the entity k, $W_{jk}(n)$ is a rating provided by an entity j, located a distance n−1 from the second entity for the entity k, $R_j(n-1)$ is the personalized ratee reputation of the entity j from the perspective of the second entity, and D is a range of allowable personalized reputation values.

Referring to FIG. 1, the following example illustrates applying Equation 4 to determine the personalized ratee reputation of entity $A_{11}$ from the perspective of entity $A_1$, where D=1.

$$R_{11} = \frac{R_9(.2) + R_8(.9)}{R_8 + R_9}, \quad \text{where}$$

$$R_9 = \frac{R_3(.2)}{R_3} = .2, \quad \text{and where}$$

$$R_8 = \frac{R_3(.6)}{R_3} = .6, \quad \text{such that}$$

$$R_{11} = \frac{.2(.2) + .6(.9)}{.8} = .725.$$

SUMMARY OF THE INVENTION

The Histos reputation mechanism, in determining a reputation of a first entity from the perspective of the second entity, does not consider a distance of a shortest reputation path, i.e., the lowest number of rating links, between the first and second entity. Therefore, the determined reputation does not reflect the distance of the shortest reputation path.

It may be desirable to consider the shortest distance between the first and second entities when determining the reputation of the first entity from the perspective of the second entity. Considering this distance addresses the principle that the second entity may have more trust for a first entity with which the second entity is in relatively closer contact than in a first entity with which the second entity is in relatively distant contact.

Accordingly, provided herein is a method and system for determining a personalized ratee reputation of a first entity from a perspective of a second entity, where the determined ratee reputation is weighted according to a distance of a shortest reputation path between the first and second entities.

In an embodiment, for a population of entities, a personalized ratee reputation of a first entity from the perspective of a second entity is determined. The second entity is associated with the first entity by one or more rating paths, where a rating path includes one or more rating links. Each rating link defines a rating of a rated entity provided by a rating entity, and each rating path has a length defined as a number of rating links included in the path. Each entity included on one of the rating paths has a level defined as a number of rating links between the entity and the second entity. A breadth-first search is performed, beginning at the second entity, to determine, from the one or more rating paths, one or more first rating paths that have a first length equal to a shortest length between the first entity and the second entity. For each determined first rating path, a third entity on the first rating path that has a level equal to one less than the first length is identified. For each identified third entity, a first rating of the first entity provided by the third entity is determined, and the first ratings are combined. The personalized ratee reputation is then produced by weighting the combined first ratings by an amount according to the first length.

This embodiment may be implemented as a computer program product that includes a computer readable medium and computer readable signals stored on the computer readable medium that define instructions. These instructions, as a result of being executed by a computer, instruct the computer to perform the acts described above for this embodiment.

In another embodiment, a personalized ratee reputation generator is provided for determining, in a population of entities, a personalized ratee reputation of a first entity from the perspective of a second entity. The second entity is associated with the first entity by one or more rating paths, where a rating path includes one or more rating links. Each rating link defines a rating of a rated entity provided by a rating entity, and each rating path has a length defined as a number of rating links included in the path. Each entity included on one of the rating paths has a level defined as a number of rating links between the entity and the second entity. The system includes at least a path-searching module, a first look-up module, a second look-up module, and a ratings combining module. The path-searching module receives as input an indication of the first entity and an indication of the second entity. The path-searching module performs a breadth-first search beginning at the second entity and determines, from the one or more rating paths, one or more first rating paths that have a first length equal to a shortest length between the first entity and the second entity. The path-searching module provides as output an indication of the one or more first rating paths. The first look-up module receives as input the indication of the one or more first rating paths and identifies, for each determined first rating path, a third entity on the first rating path that has a level equal to one less than the first length. The first look-up module provides as output an indication of the one or more third entities. The second look-up module receives as input the indication of the first entity and the indication of the one or more third entities, and determines, for each third entity, a first rating of the first entity provided by the third entity. The second look-up module provides as output the first ratings. The ratings combining module receives as input the first ratings, generates the personalized ratee reputation by combining the first ratings and weighting the combined first ratings by an amount according to the first length, and provides as output the personalized ratee reputation.

In yet another embodiment, for a population of entities, a system for determining a personalized ratee reputation of a first entity from the perspective of a second entity is provided. The second entity is associated with the first entity by one or more rating paths, where a rating path includes one or more rating links. Each rating link defines a rating of a rated entity provided by a rating entity, and each rating path has a length defined as a number of rating links included in the path. Each entity included on one of the rating paths has a level defined as a number of rating links between the entity and the second entity. The system includes: means for performing a breadth-first search beginning at the second entity to determine, from the one or more rating paths, one or more first rating paths that have a first length equal to a shortest length between the first entity and the second entity; means for identifying, for each determined first rating path, a third entity on the first rating path that has a level equal to one less than the first length; means for determining, for each identified third entity, a first rating of the first entity provided by the third entity; means for combining the first ratings; and means for producing the personalized ratee reputation by weighting the combined first ratings by an amount according to the first length.

The features and advantages of the invention described above and other features and advantages of the invention will be more readily understood and appreciated from the detailed description below, which should be read together with the accompanying drawing figures.

DETAILED DESCRIPTION

I. Determining a Rater Reputation

Figure 1:
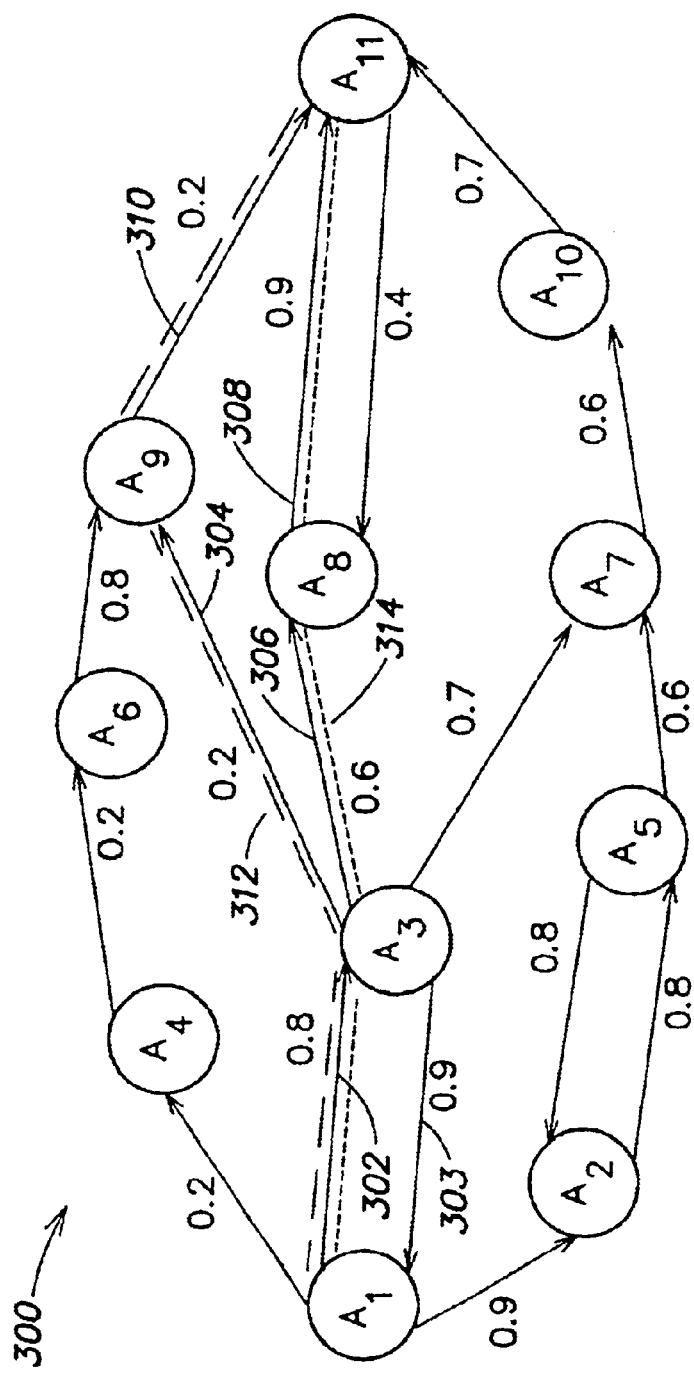
FIG. 1 is a block diagram illustrating a representation of an on-line community of entities interconnected by several rating links.

Described below is a method and system for determining a rater reputation of a first entity. Although determining a rater reputation is described below primarily in connection to ratings developed in connection with electronic exchanges, such determination may be applied to any of a variety of ratings, regardless of whether the rating is provided as a result of an electronic exchange. For example, a rating may represent a qualitative assessment of an in-person interview of a job candidate, an in-person sale or a credit transaction.

The rater reputation produced using the method and system described below may have any of a variety of applications such as, for example, assessing the trustworthiness (as a rater) of a reference, an employment recruiter, a rating agency, or any other entity that provides recommendations, scores, rankings or ratings of other entities.

A rater reputation may be determined, for one or more ratings of one or more rated entities, respectively, provided by a first entity, by comparing each rating to other ratings of the rated entity provided by other entities. For each rated entity, the statistical similarity between the rating provided by the first entity and ratings provided by the other entities as determined by the comparison, i.e., the rating predictability, may serve as a basis for a rater reputation of the first entity.

Optionally, the ratings provided by the other entities may be ratings provided at points in time that occur after a point in time at which the rating by the first entity is provided. Determining a rater reputation of a first entity by comparing ratings provided by the first entity to such future ratings may provide a more accurate estimate of the first entity's rater reputation than comparing these ratings to past ratings of other entities. This more accurate estimate may result from the fact that if past ratings are used for the comparisons, and the first entity is aware that past ratings are being used, the first entity may access the past ratings and bias her ratings to be consistent with the past ratings, thus resulting in a higher reputation of the first entity than otherwise would occur.

Accordingly, by using future ratings, which are necessarily unknown to the first user, for the comparisons, the first entity has less incentive to bias her ratings, resulting in more honest ratings being provided by the first entity. These more honest ratings result in a more accurate estimation of the rater reputation of the first entity.

In an aspect of determining a rater reputation of an entity, the result of the comparison of (a) the rating provided by the first rater of a rated entity and (b) other ratings of the rated entity provided by other raters may be weighed over a ratee reputation deviation of the rated entity, as will be described in more detail below in relation to FIG. 5. This ratee reputation deviation represents a deviation of ratings of the rated entity from an expected value of the rating of the rated entity. Entities whose ratee reputations fluctuate over a wide range of values, such as new entities and entities that receive a wide range of ratings (i.e., unstable entities), typically have high ratee reputation deviations. This weighting of the comparison results in a rating predictability that is greater for greater values of ratee reputation deviation and less for lesser values of ratee reputation deviation.

Figure 2:
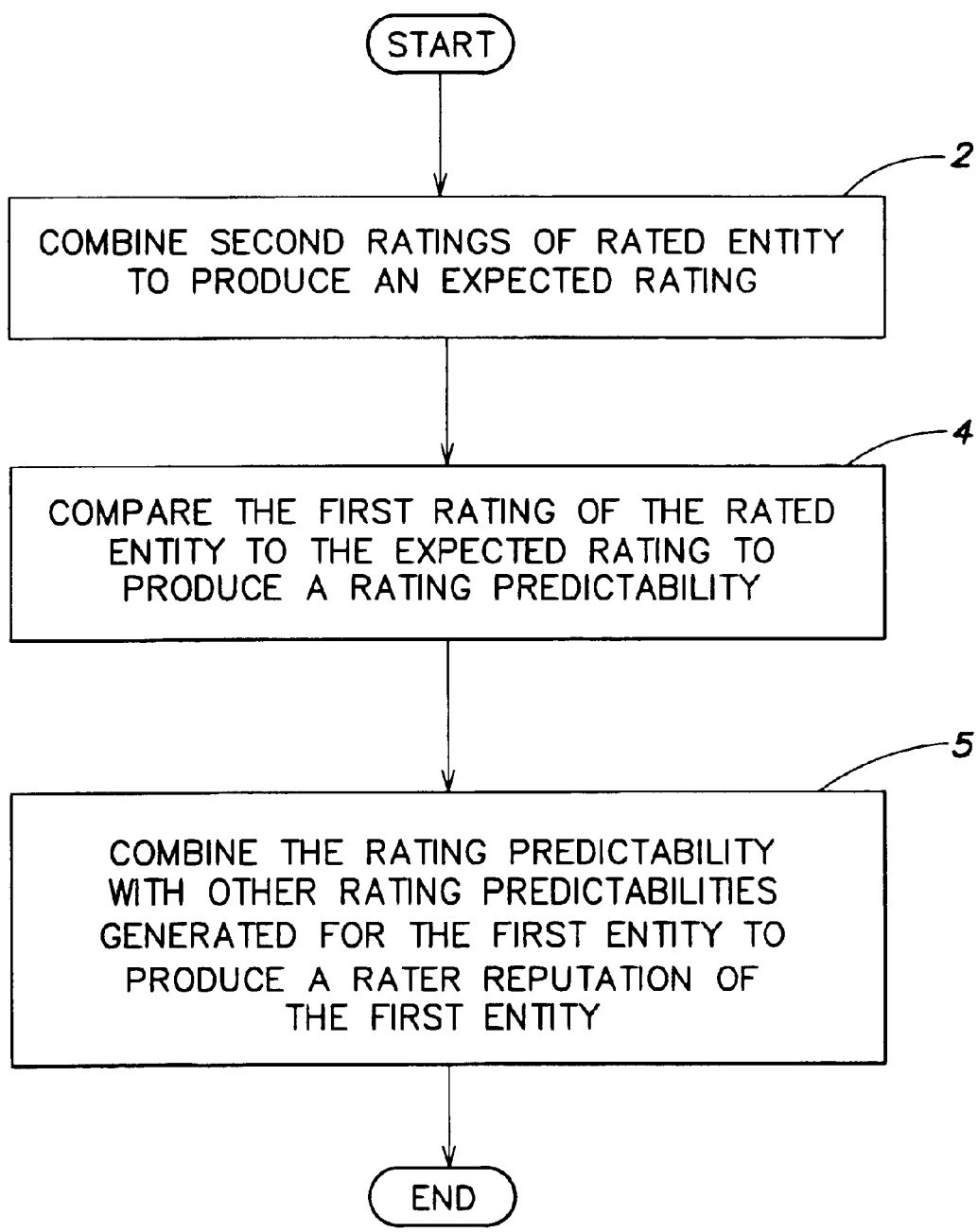
FIG. 2 is a flowchart illustrating an example embodiment of a method of determining a rater reputation of an entity.

FIG. 2 is a flowchart illustrating an example embodiment of a method of generating a rater reputation of an entity, where a first rating of a rated entity by a first entity and second ratings of the rated entity provided by other entities are provided. The first and second ratings may be provided by accessing two or more entries of a data structure such as, for example, a database, stored on a computer-readable medium such as, for example, a non-volatile memory (e.g., a magnetic disk, CD ROM, or magnetic tape) or a volatile memory (e.g., an integrated semiconductor memory such as RAM). Such a data structure may reside on a computer-readable medium located on a same computer at which an application running the method of generating resides and may be accessed by a bus or other known means. Alternatively, the data structure may reside at a remote location from such application, where access of the data structure may include use of one or more networks, bridges, routers, switches, hubs, other network devices, or any combination thereof. Such access may include wireless and wire (i.e., cable) transmissions.

In Act 2, two or more of the second ratings of the rated entity may be combined to produce an expected rating. This expected rating represents an expected value of the first rating in consideration of the values of the two or more second ratings. The two or more ratings to be combined may be selected according to each rating's temporal proximity to the rating provided by the first entity (i.e., the first rating), or may be selected with other criteria such as, for example, demographic similarity of the entity that provided the second rating to the first entity. Optionally, only second ratings provided temporally after the first rating are selected. Such selected second ratings may be referred to herein as future ratings. Although all of the second ratings may be selected, which may produce a more accurate expected rating, the computational time and cost will increase as the number of second ratings combined increases; consequently, it may be desirable to select less than all of the second ratings.

A limiting factor may be provided to determine a number of the second ratings to select. The value of the limiting factor may be selected to achieve an acceptable balance between (a) rater reputation accuracy and (b) the time and cost of determining the rater reputation.

In an aspect of selecting second ratings, second ratings provided by the first entity are excluded from selection. Such exclusion prevents the first entity from providing multiple ratings of the rated entity, and intentionally providing a same or similar value as each of the multiple ratings to artificially increase the first entity's rater reputation.

The selected second ratings may be combined by calculating an average of the second ratings. Optionally, this calculated average may be weighted, where each selected second rating is weighted according to the reputation of the entity that provided the second rating relative to the reputation of the other entities that provided second ratings. For example, a weighted average of second ratings provided by other entities may be determined by applying the following equation:

$$E_{jk}^{ratee,other} = \frac{\sum_{u=j+1}^{k} W_u R_u^{rater}}{\sum_{u=j+1}^{k} R_u^{rater}},$$ Equation 5:

where k−j is the number of selected second ratings, $E_{jk}^{ratee,other}$ is the weighted average of the k−j second ratings, $W_u$ is the rating provided by a second entity u, and $R_u^{rater}$ is the rater reputation of second entity u. Although applying Equation 5 represents combining only future rating (from j+1 to k), other second ratings may be combined. For example, in Equation 5, above, u may begin at u=j−1−C/2 and end at k=j−1+C/2, where 1/C is a change rate factor, described in more detail below in relation to Act 12. A situation in which it may be desirable to determine an expected rating by combining selected second ratings other than future ratings is described below in more detail in relation to "seeding" a system.

Weighting each second rating according to the reputation of the entity that provided the second rating generates an expected rating that gives more weight to ratings by those entities that have higher rater reputations. For example, if most of the higher second ratings were provided by entities having a low rater reputation, and most of the lower second ratings were provided by entities having a higher rater reputation, then the calculated expected rating would be lower than a raw average. This lower expected rating represents a bias towards the second ratings provided by the entities having a higher rater reputation. Such weighting of each selected second rating represents the principle that entities having higher rater reputations give more accurate ratings, and thus the ratings they provide are more valuable in determining a rater reputation of an entity (by definition) and, therefore, should be given more weight than ratings provided by entities having lower rater reputations.

The average rating of the selected second ratings also may be weighted according to the relative proximity of the times at which the selected second ratings are provided to the time at which the first rating is provided. In other words, a rating provided closer in time to the first rating time will have a greater weight and thus more of an impact on the calculated average than a temporally more distant rating. This weighting reflects the principle that an entity's ratee reputation may change over time. Thus, for a given time at which a first rating is compared to other ratings, temporally closer ratings should be given more weight in determining the rater reputation of the first entity. Conversely, temporally more distant ratings should have lesser weight in determining the rater reputation of the first entity.

If only second ratings occurring after the first point in time (i.e., future ratings) are selected, then the earlier the second rating is provided, the greater is the weight attributed to the second rating. Further, time may be divided into a number of intervals, where each second ratings is provided during one of the intervals. Each second rating may be weighted according to the temporal proximity to the first point in time of the interval in which the second rating was provided.

Optionally, each selected second rating may be placed in a temporal order according to its relative temporal proximity to the first point in time, and each selected second rating may be weighted according to its position in this order. If only future ratings are selected, then the earlier the second rating is provided, the lower (i.e., the closer to the beginning) the rating is in the temporal order. Thus, a temporally-weighted average may be defined by the following equation:

$$E_{jk}^{ratee,other} = \frac{\sum_{u=j+1}^{k} W_u f(u)}{\sum_{u=j+1}^{k} f(u)},$$ Equation 6:

where f(u) is a temporal function such as, for example:

$$f(u) = \frac{1}{T^u},\quad \text{Equation 7:}$$

where T is a constant number having a value >1, and u may be: the position of rating $W_u$ in a temporal order; a temporal proximity of the rating from the first point in time; or a temporal proximity of a time interval in which the rating was provided to the first point in time.

Combining Equations 6 and 7, an expected rating may be calculated by applying the following equation:

$$E_{jk}^{ratee,other} = \frac{\sum_{u=j+1}^{k} W_u R_u^{rater} f(u)}{\sum_{u=j+1}^{k} R_u^{rater} f(u)}. \quad \text{Equation 8:}$$

Other statistical methods may be used to determine an expected rating of an entity.

Returning to the method of FIG. 2, next, in Act 4, the first rating of the rated entity, provided by the first entity, may be compared to the expected rating, to produce a rating predictability. This rating predictability may be a negative function of an absolute difference between the first rating and the expected rating. As used herein, a first value is a negative function of a second value if the first value decreases as a result of the second value increasing, and increases as a result of the second value decreasing. Further, as used herein, a first value is a positive function of a second value if the first value increases as a result of the second value increasing, and decreases as a result of the second value decreasing.

For example, comparing the first ratings and the second ratings may include determining the absolute difference (i.e., magnitude of the difference) between the first rating and the second rating and then applying a Gaussian distribution function to the determined absolute difference to produce the first rating predictability. If a Gaussian distribution function is being applied, then the absolute difference between the first rating and the expected rating may first be divided by a ratee reputation deviation of the rated entity. The ratee reputation deviation defines a deviation of ratings by other entities of the rated entity from an expected rating, and is described in more detail below in relation to FIG. 6. Thus, a rating predictability for the first rating may be determined by applying the following equation:

$$P_j(X) = \frac{1}{2\pi} \cdot e^{-\frac{x^2}{2}},\ X = \frac{W_j - E_{jk}^{ratee,others}}{RD_{j-1}^{ratee}}, \quad \text{Equation 9:}$$

where $RD_{j-1}^{ratee}$ is the ratee reputation deviation of the rated entity, and $P_j(X)$ is the rating predictability of the first rating $W_j$.

Dividing the absolute difference by the rates reputation duration has the effect of weighting the absolute difference over the ratee reputation deviation. This weighting may be desirable to account for the stability or reliability of rater ratings of the rated entity in determining the rates reputation of the first entity. For example, if the ratee reputation of the rated entity is unstable (i.e., ratings provided for the rated entity vary considerably), the rater reputation of the first entity should be changed less by the difference between the expected rating and the first rating. Conversely, if the ratee reputation of the rated entity is stable, the rater reputation of the first entity should be changed less by the difference.

Alternatively, other functions may be applied to determine the rating predictability of the first rating. For example, the absolute difference may be subtracted from a constant such as, for example, a constant representing a maximum allowed rater reputation value. For example, if the range of allowed rater reputation values is from 0 to 1, then the absolute difference between the first rating and the expected rating may be subtracted from 1, such that the rating predictability is a negative function of the absolute difference. Accordingly, the rating predictability of the first rating may be determined by applying the following equation:

$$P_j(X) = 1 - |W_j - E_{jk}^{ratee,others}| \cdot \left(\frac{RD_{min}^{ratee}}{RD_{j-1}^{ratee}}\right), \quad \text{Equation 10:}$$

where $RD_{min}^{ratee}$ is the minimum allowed ratee reputation deviation. Other methods may be used to determine a rating predictability of an entity.

If the first rating is a first-time rating by the first entity, then the generated rating predictability may alone serve as the rater reputation of the first entity.

Alternatively, if the first entity has provided other ratings of other entities, and rating predictabilities have been generated from these other ratings (e.g., by performing Acts 2 and 4 on the provided ratings), then, in Act 5, the other rating predictabilities may be combined with the rating predictability generated in Act 4 to produce the rater reputation of the first entity. Act 5 may be implemented in any of several different ways. In one implementation, Act 5 may be implemented by averaging all of the generated rating predictabilities associated with each rating provided by the first entity. Accordingly, a rater reputation may be determined by applying the following equation:

$$R^{rater} = \frac{1}{n} \cdot \sum_{j=1}^{n} P_j(X), \quad \text{Equation 11:}$$

where n is the number of ratings provided by the first entity and $R^{rater}$ is the rater reputation.

If the rater reputation of the first entity is determined by averaging the first entity's rating predictabilities, the average may be a weighted average. For example, each rating predictability may be weighted as a positive function of the time at which the rating associated with the rating predictability is provided. For example, the earlier the associated rating is provided, and thus the further away in time from when the rater reputation is being determined, the lower the weighting of the predictability. Optionally, each rating predictability may be placed in a temporal order according to the time at which its associated rating was provided, and each predictability may be weighted according its position in this order. Further, time may be divided into a number of intervals, and the temporal intervals may be placed in a temporal order. A rating predictability then may be weighted according to the position of the temporal interval in the temporal order.

Weighting the rating as such represents the principle that an entity's rater reputation may change over time, and thus more recent ratings should be given more weight than older ratings in determining the rater reputation of an entity. A rater reputation, determined by applying such a weighted average of predictabilities, may be determined by applying the following equation:

$$R^{rater} = \frac{\sum_{j=1}^{n} P_j(X) \cdot f(j)}{\sum_{j=1}^{n} f(j)}$$ Equation 12:

where f(j) is a temporal function such as, for example:

$$f(j) = \frac{1}{V^j},$$ Equation 13:

where V is a constant number having a value <1, and j is the position of rating predictability, $P_j$, in a temporal order, or a time at which the rating associated with the predictability was provided, or a position in a temporal order of a temporal interval during which the associated rating was made. Other weightings and combinations of weightings may be applied to an average predictability to determine a rater reputation of an entity such as, for example, a combination of entity reputations associated with each predictability, described in detail below in relation to Act 10.

Determining a rater reputation of a first entity by averaging rating predictabilities of the first entity may become more cost prohibitive as the number of ratings of other entities provided by the first entity increases.

Accordingly, as an alternative implementation of Act 5, the rater reputation may be determined recursively. Determining a rater reputation recursively, for example, as described below, saves computational space and time, particularly as the number of ratings of other entities provided by the first entity grows.

Such a recursive determination may include: providing a previously determined rater reputation (i.e., an initial rater reputation) of the first entity; determining a rater reputation adjustment (which may be a positive or negative value) based on the generated rating, and adding the reputation adjustments to the previously determined rater reputation to produce the rater reputation.

Figure 3:
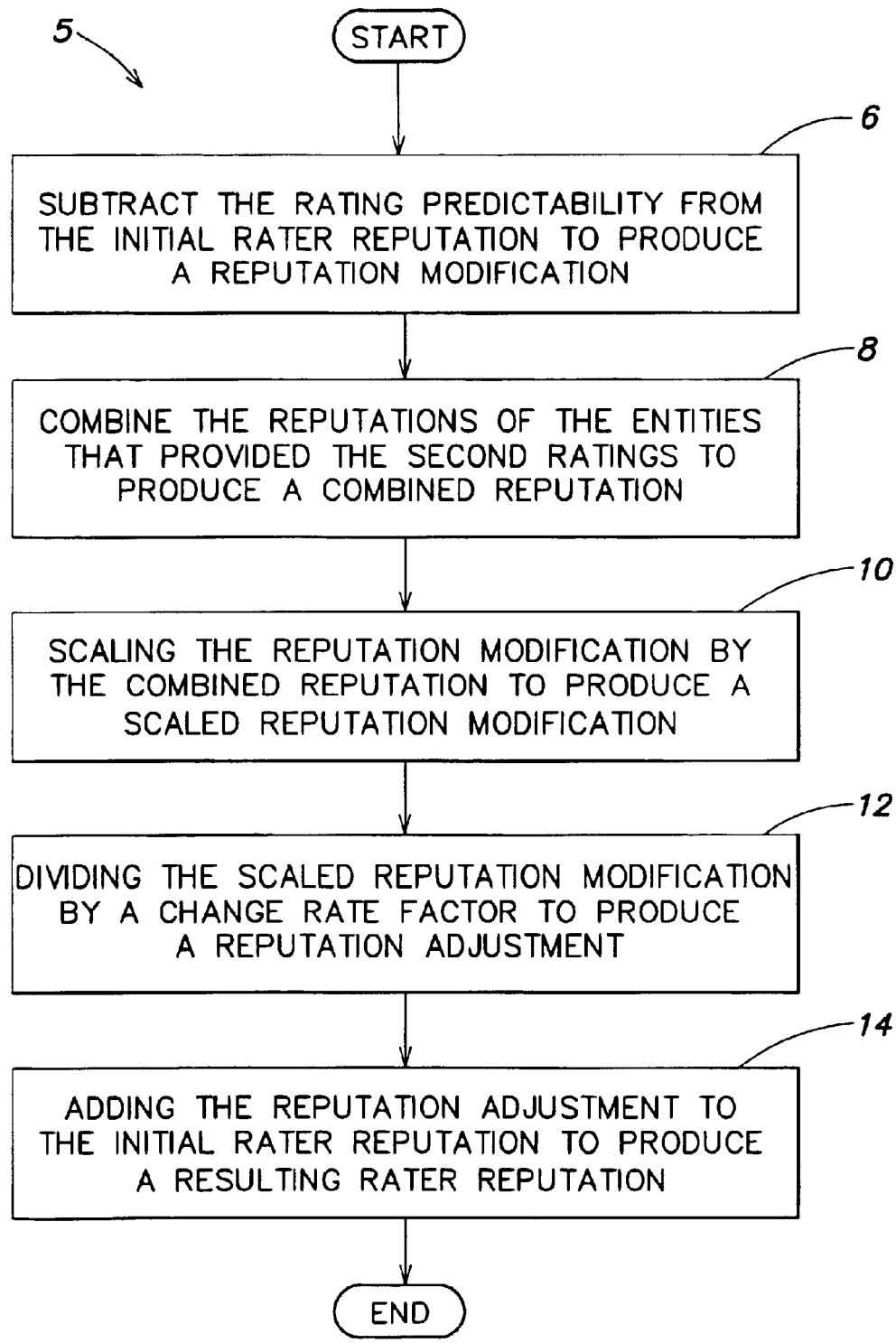
FIG. 3 is a flow chart illustrating an example embodiment of a method of combining rating predictabilities to produce a rater reputation.

FIG. 3 is a flow chart illustrating an example implementation of Act 5. In Act 6, the rating predictability may be subtracted from the initial rater reputation to produce a reputation modification. Next, in Act 8, the reputations of the entities that provided the selected second ratings may be combined to produce a combined reputation such as, for example, by calculating an average reputation from these reputations. For example, a combined reputation may be determined by applying following equation:

$$R_{combined} = \sum_{u=j+1}^{k} \frac{R_u^{other}}{k-j},$$ Equation 14:

where $R_{combined}$ is the combined reputation $R_u^{other}$ is the rating of an entity that provided one of the selected second ratings. Act 8 may be performed in sequence or concurrently with Acts 2–6.

Next, in Act 10, the reputation modification may be scaled by the combined reputation to produce a scaled reputation modification. This scaling has the effect of weighting the reputation modification according to the reputations of the entities corresponding to the second ratings. If the combined reputation is an average reputation of the entities that provided the selected second ratings and has a relatively high value, then the reputation modification is scaled such that the reputation adjustment is relatively high. Conversely, if the average rater reputation of these raters is relatively low, then the reputation adjustment resulting from the scaled reputation modification is relatively low. The scaled reputation modification may be determined by applying the following equation:

$$R_{scaled} R_{combined}[P(X) - R_{j-1}^{rater}],$$ Equation 15 where $R_{j-1}^{rater}$ is the initial rater reputation, $[P(X) - R_{j-1}^{rater}]$ is the reputation modification, and $R_{scaled}$ is the scaled reputation modification.

Next, in Act 12, the scaled reputation modification maybe divided by a change rate factor to produce a reputation adjustment. This change rate factor controls the rate at which the first rating and the resulting rating predictability can change the rater reputation of the first entity. For example, if the rate change factor has a high value, then the rate of change will be slower such that a relatively higher number of ratings will have to be provided by an entity before the rater reputation of the entity approaches an Actual reputation of the entity.

Next, in Act 14, the reputation adjustment is added to the initial rater reputation to produce a resulting rater reputation. The resulting rater reputation may be determined by applying the following equation:

$$R_j^{rater} = R_{j-1}^{rater} + \frac{1}{C} \cdot R_{scaled},$$ Equation 16:

where 1/C is the change rate factor and $R_j^{rater}$ is the resulting rater reputation. The change rate factor is named as such because its value impacts the rate at which the rater reputation changes value. Optionally, the value of C may be set equal to the value of $T_o$, the effective number of observations, described below in relation to Equations 19 and 20.

In an aspect of recursively determining a rater reputation of an entity, for example, by applying Equation 16, an original rater reputation (i.e., an entity's rater reputation before a first rater reputation has been determined for the entity), $R_0^{rater}$, is initialized to zero. Consequently, an entity's rater reputation has its lowest value before the entity provides a first rating of another entity. Such an original rater reputation prevents an entity with a low rater reputation from creating a new identity as a new entity and beginning with a higher rater reputation than the low reputation of the entity.

Recursively determining a rater reputation of a first entity, for example, by applying Equation 16, may result in an rater reputation that asymptotically approaches an Actual rater reputation of the first entity as the number or ratings of other entities provided by the first entity increases. An Actual rater reputation of the entity may be determined by averaging the determined rating predictabilities (and possibly weighting the average) for each rating provided by the first entity, for example, by applying Equation 11 or 12, or a variation thereof. As described above, this averaging may become cost prohibitive as the number of ratings provided by the first entity increases. Further, this averaging does not penalize an entity from starting over as a new entity by initializing to zero an original rater reputation of the entity. Both of these shortcomings of calculating an Actual reputation are avoided by initializing to zero an original rater reputation of an entity and by recursively determining the rater reputation of the entity, for example, by applying Equation 16 and variations thereof.

In an aspect of recursively determining a rater reputation of an entity, in response to receiving a rating of a rated entity, the rater reputations of the entities that provided the most recent M ratings may be determined. In other words, each of the selected second ratings is one of the most recent M ratings.

Further, the determined rater reputation for each rating entity may be weighted as a function of how recent the rating entity provided its rating in relation to how recent the other rating entities provided their ratings. For example, for each of rating entities corresponding to one of the last M ratings received, the rating entity's rater reputation may be determined by application of the following equation:

$$R(m)_j^{rater} = R(m)_{j-1}^{rater} + \frac{m}{M} \cdot \frac{1}{C} \cdot R(m)_{scaled} \quad \text{Equation 17:}$$

where M is the number of most recent ratings, m is the number of ratings (of the most recent ratings) received after the rating received from the rating entity plus 1 (i.e., for the rating entity that provided the most recent rating, the value of m=1), and $R(m)_{scaled}$ is the scaled rater reputation modification as described above in relation to Equation 16, where, for the expected rating (as described in relation to Equation 8) from which the scaled rater reputation modification is generated, k−j=m.

For example, if rater reputations are being determined for the rating entities that provided the most recent 20 ratings, then, M=20. For the rating entity that provided the earliest rating, m=20 and m/M=1. Further, for the rating entity that provided the most recent rating, m=1 and m/M=1/20.

By weighting the adjustment to the rater reputation of an entity by m/M, the amount that a rating entity's rater reputation is adjusted is proportional to the number of ratings received for a rated entity after the rating provided by the rating entity. This weighting reflects the principle that if there are more ratings received after the rating provided by the rating entity, then there is more information to estimate the predictability of the rating entity, as described above in relation to Equations 9 and 10, from which the rater reputation adjustment is determined. This use of more information results in more accurate estimations of the predictability of the rating entity, and a more accurate rater reputation adjustment. Accordingly, by weighting the rater reputation adjustment as described above in relation to Equation 17, the rater reputation adjustment is weighted as a function of this accuracy.

Other techniques may be used for weighting a rater reputation adjustment as a function of how recent the rating entity provided its rating in relation to how recent the other rating entities provided their ratings.

As described above, in an aspect of determining a rater reputation of an entity, each time a new entity enters a population or community of entities that use a rating system incorporating rater reputation, the new entity may have an original rater reputation initialized to zero. Initializing an original rater reputation to zero may be desirable if an entity is capable of having multiple identities. In a system where an entity is restricted to a lifetime persistent identity, for example, a social security number, then the original rater reputation may not be initialized to zero, but may be initialized to another value. For example, the original rater reputation may be initialized to an average rater reputation value.

In some situations, an entire population of entities that have been using a rating system to rate each other, and thus have pre-collected ratings, may want to determine a rater reputation of one or more, possibly all, entities of the population using these pre-collected ratings. Such determination of rater reputations for a population of entities using pre-collected ratings may be referred to herein as "seeding" a reputation system. If seeding a reputation system, one or more first entities of the population may not have provided a sufficient number of ratings of other entities such that a recursively generated rater reputation of these first entities approximates an Actual rater reputation of these first entities, respectively. Consequently, the resulting rater reputation of one or more first entities that have provided relatively few ratings is lower than the resulting reputation of one or more first entities that have provided relatively many ratings, irrespective of the Actual ratings provided by the first entities.

Accordingly, in an aspect of seeding a reputation system by recursively determining a rater reputation of a first new entity, pre-collected ratings may be used to determine the rater reputation as follows. In a first pass of determining the rater reputation, for example, by applying Equation 16 or variations thereof, the pre-collected ratings are used and the original rater reputation of the first new entity may be initialized to zero. A second pass of determining the rater reputation may use the same pre-collected ratings and initialize the original rater reputation of the first new user to the rater reputation resulting from the first pass. This initialization to a resulting reputation may be repeated in other passes until the resulting reputation adequately approximates the Actual rater reputation of the first new entity.

Further, to seed a reputation system by recursively determining a rater reputation of a first entity, the expected rating for each first rating provided by the first entity may be determined by applying the following equation:

$$E_i^{ratee} = \frac{1}{D} \cdot \sum_{i-1-C/2}^{i-1+C/2} R_{i-1}^{ratee}, \quad \text{Equation 18:}$$

where $R_{i-1}$ is the ratee reputation of the rated entity at i-1, D is the range of allowed reputation values, 1/C is the change rate factor and $E_i^{ratee}$ is the determined expect rating.

Figure 4:
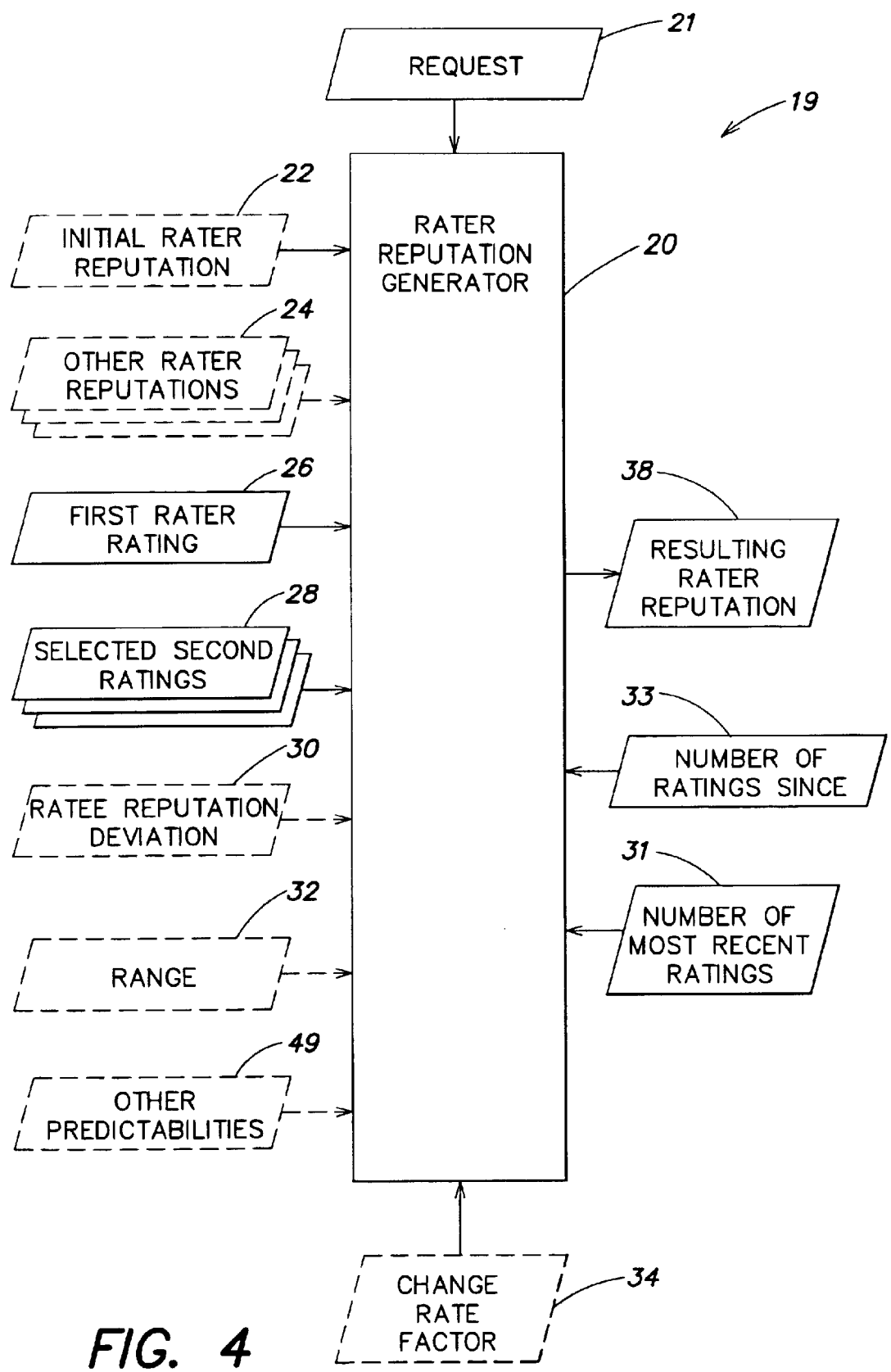
FIG. 4 is data flow diagram illustrating an example embodiment of a system for generating a rater reputation of an entity.

FIG. 4 is a data flow diagram illustrating an example embodiment of a system 19 for generating a rater reputation 38. The rater reputation generator 20 may receive a request 21 from a user indicating a request for a first entity's reputation. In response to the user request 21, the rater reputation generator 20 may receive as input a first rater rating 26 and selected second ratings 28, and generate the resulting rater reputation 38 as output, for example, by performing Acts 2–5 of FIG. 2. In one implementation, the rater reputation generator 20 may also receive as input other rating predictabilities 49 to generate a resulting rater reputation 38 by averaging rating predictabilities, as described above in relation to FIG. 2.

In another implementation, the rater reputation generator 20 may also receive as input an initial rater reputation 22, other rater reputations 24, a ratee reputation deviation 30, a range 32, and a change rate factor 34, and use these inputs in addition to inputs 26 and 28 to generate a resulting rater reputation 38 such as, for example, by applying Acts 6–14 of FIG. 3.

In yet another implementation, the rater reputation generator further may receive a value 31 indicating a number of most recent ratings and a value 33 indicating the number of ratings provided for the rated entity after the first rater rating 26 was provided. Values 31 and 33 correspond to values M and m, respectively described above in relation to Equation 17.

Figure 5A:
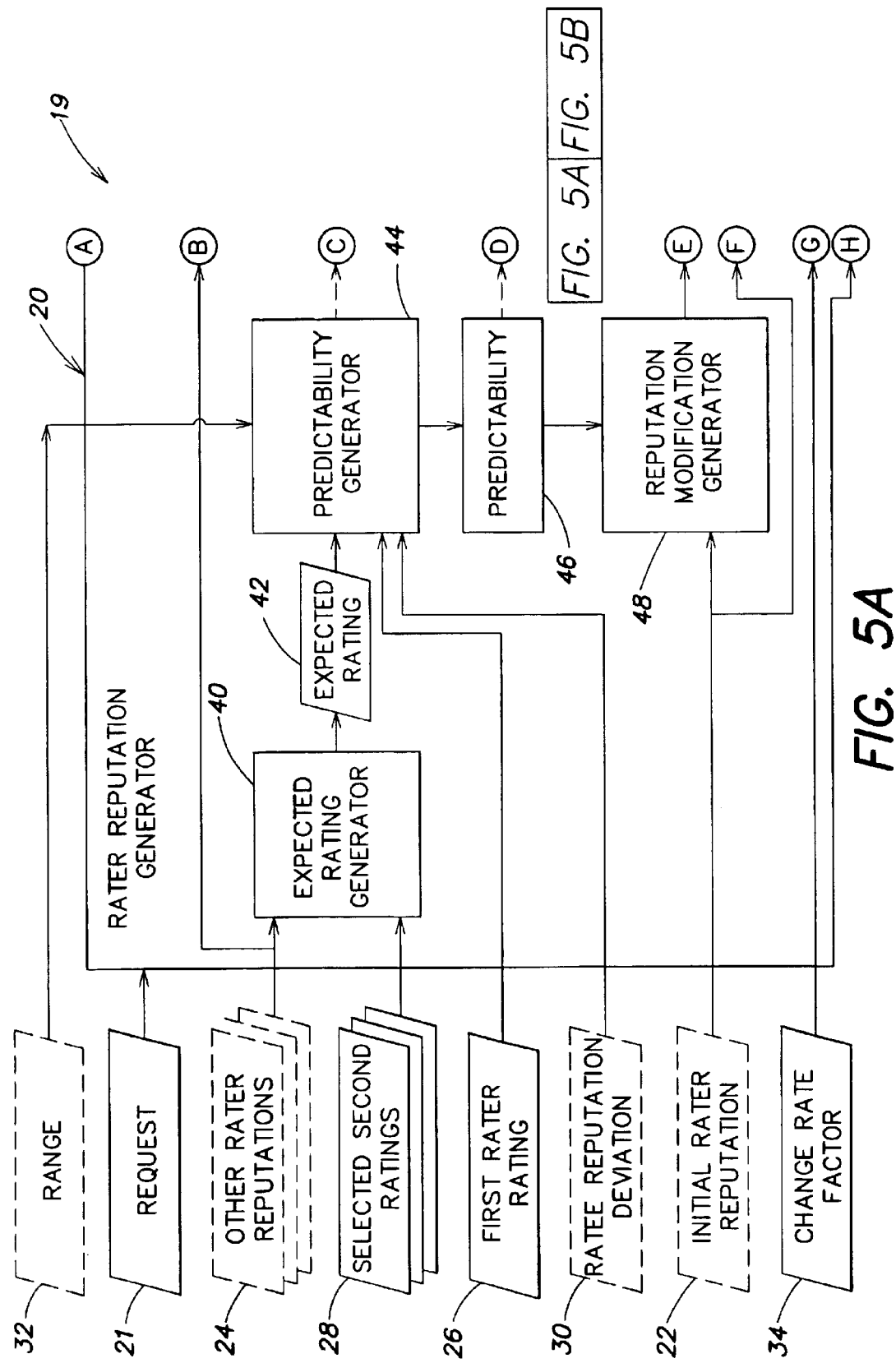
FIG. 5 is a data flow diagram illustrating an example embodiment of a system for generating a rater reputation of an entity.
Figure 5B:
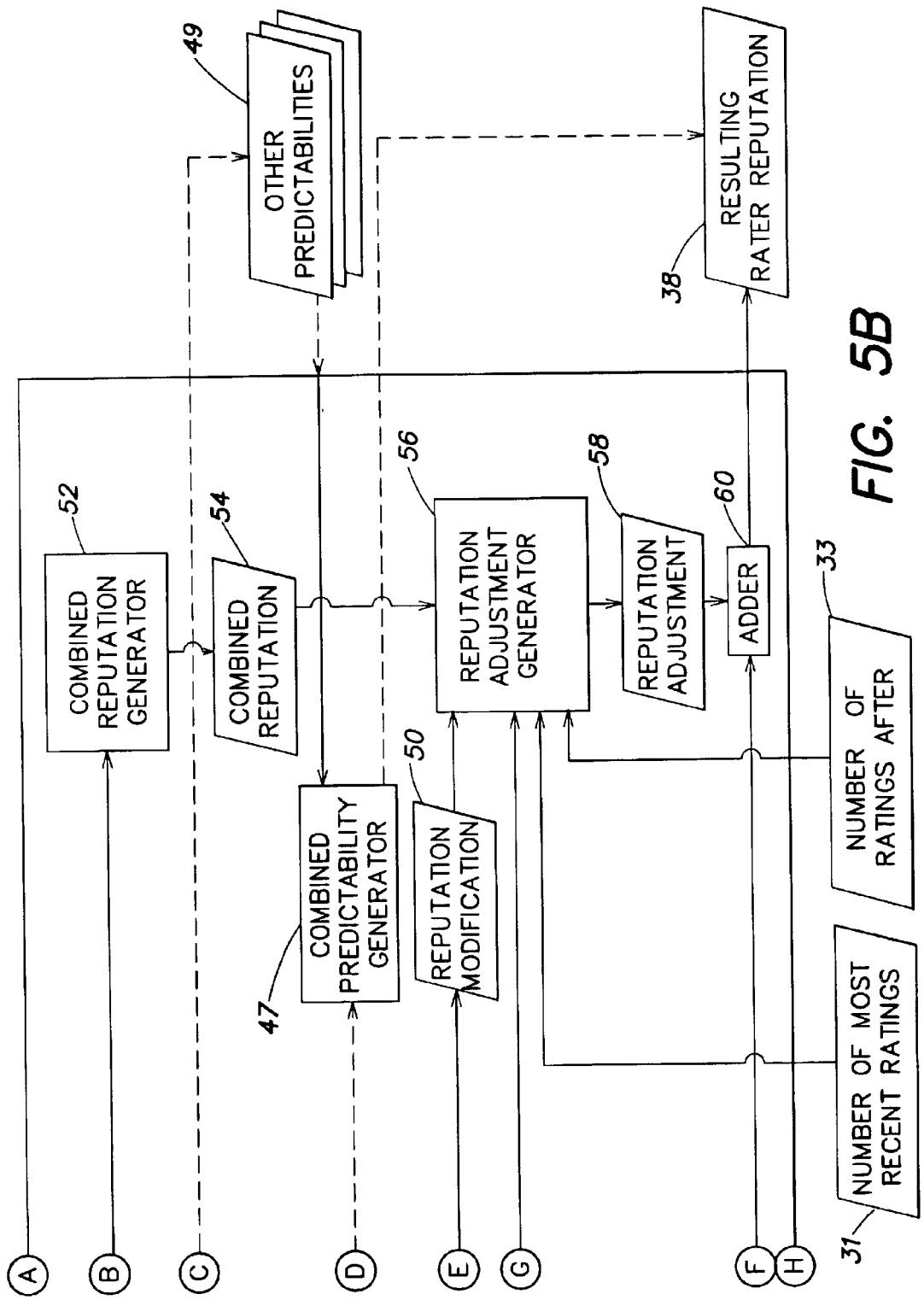

FIG. 5 is a data flow diagram illustrating a more detailed example embodiment of the system 19 for generating a resulting rater reputation 38. The rater reputation generator 20 may include an expected rating generator 40, a predictability generator 44, a reputation modification generator 48, a combined predictability generator 47, a combined reputation generator 52, a reputation adjustment generator 56 and an adder 60.

In response to the rater reputation generator 20 receiving the user request 21, the expected rating generator 40 may receive as input the selected second ratings 28 and generate as output an expected rating 42. The expected rating generator 40 also may receive as input other rater reputations 24, and use this input 24 in addition to input 28, to generate the expected rating 42. The other rater reputations 24 may be the reputations of the entities that provided the selected second ratings 28. Expected rating generator 40 may generate expected ratings 42 in accordance with the various techniques described above in relation to Act 2 of FIG. 2.

The predictability generator 44 may receive as input the expected ratings 42 and the first rater rating 26 and produce a rating predictability 46 as output. The predictability generator 44 also may receive the ratee reputation deviation 30 and the range 32, and use both of these inputs to help produce the rating predictability 46. The predictability generator 44 may generate the rating predictability 46 in accordance with the various techniques discussed above in relation to Act 4 of FIG. 2.

The rater reputation of a first entity may be determined according to Equations 11 or 12 by including in the rater reputation generator the combined predictability generator 47 that receives as input rating predictability 46 and other rating predictabilities 49 (which may have been generated by predictability generator 44) and generates as output a resulting rater reputation 38.

The reputation modification generator 48 may receive a rating predictability 46 and an initial rater reputation 22, and generate a reputation modification 50. The reputation modification generator 48 may generate the reputation modification 50 by subtracting the rating predictability from the initial rater reputation as described above in relation to Act 6 of FIG. 3.

The combined reputation generator 52 may receive other rater reputations 24 and generate a combined reputation value 54. The combined reputation generator 52 may calculate the average of the other rater reputations to determine the combined reputation 54.

A reputation adjustment generator 56 may receive the combined reputation 54 and the reputation modification 50 and generate a reputation adjustment 58. The reputation adjustment generator 56 may also receive the change rate factor 34. The reputation adjustment generator 56 may generate the reputation adjustment 58 in accordance with the techniques described above in relation to Acts 10 and 12 of FIG. 3. As described above, the combined reputation 54 may scale the reputation modification 50 in accordance with the combined reputation 54 of the other raters.

In an embodiment, the reputation adjustment generator further receives values 31 and 33 corresponding to values M and m, respectively, and generates the rater reputation adjustment 58 as described above in relation to Equation 17.

The adder 60 may add the initial rater reputation 22 to the reputation adjustment 58 to produce the resulting rater reputation 38.

The rater reputation generator 20 and any components thereof, including expected rating generator 40, predictability generator 44, combined reputation generator 52, combined predictability generator 47, reputation modification generator 48, reputation adjustment generator 56 and adder 60, may be implemented as software, hardware, firmware or any combination thereof. The rater reputation generator 20 and any components thereof may reside on a single machine (e.g., a computer), or may be modular and reside on multiple interconnected (e.g., by a network) machines. Further, on each of the one or machines that include the rater reputation generator 20 or a component thereof, the generator 20 or component may reside in one or more locations on the machine. For example, different portions of the rater reputation generator 20 or different portions of a component may reside in different areas of memory (e.g., RAM, ROM, disk, etc.) on a computer.

The range 32 and the change rate factor 34 may be constants for the system 19 and may be stored in a reputation database or other data structure, as described in more detail below in relation to FIG. 18. The first rater rating 26, the other reputations 24, the selected second ratings 28, the ratee reputation deviation 30, the initial rater reputation 22, and values 31 and 33 also may be stored in the reputation database or other structure. In response to receiving the user request 21, the rater reputation generator 20 may access the reputation database or similar data structure and retrieve values 26, 32, 24, 28, 26, 30, 31, 32, 33 and 34 to generate the resulting rater reputation 38 as described above. The resulting rater reputation 38 then may be stored in the reputation database or other data structure for later access.

System 19, and the components thereof, are merely example embodiments of a system for generating a rater reputation. Such example embodiments are not meant to limit the scope of the invention and are provided merely for illustrative purposes, as any of a variety of other systems and components for determining a rater reputation, determining a may fall within the scope of the invention.

II. Determining a Ratee Reputation Deviation

Figure 6:
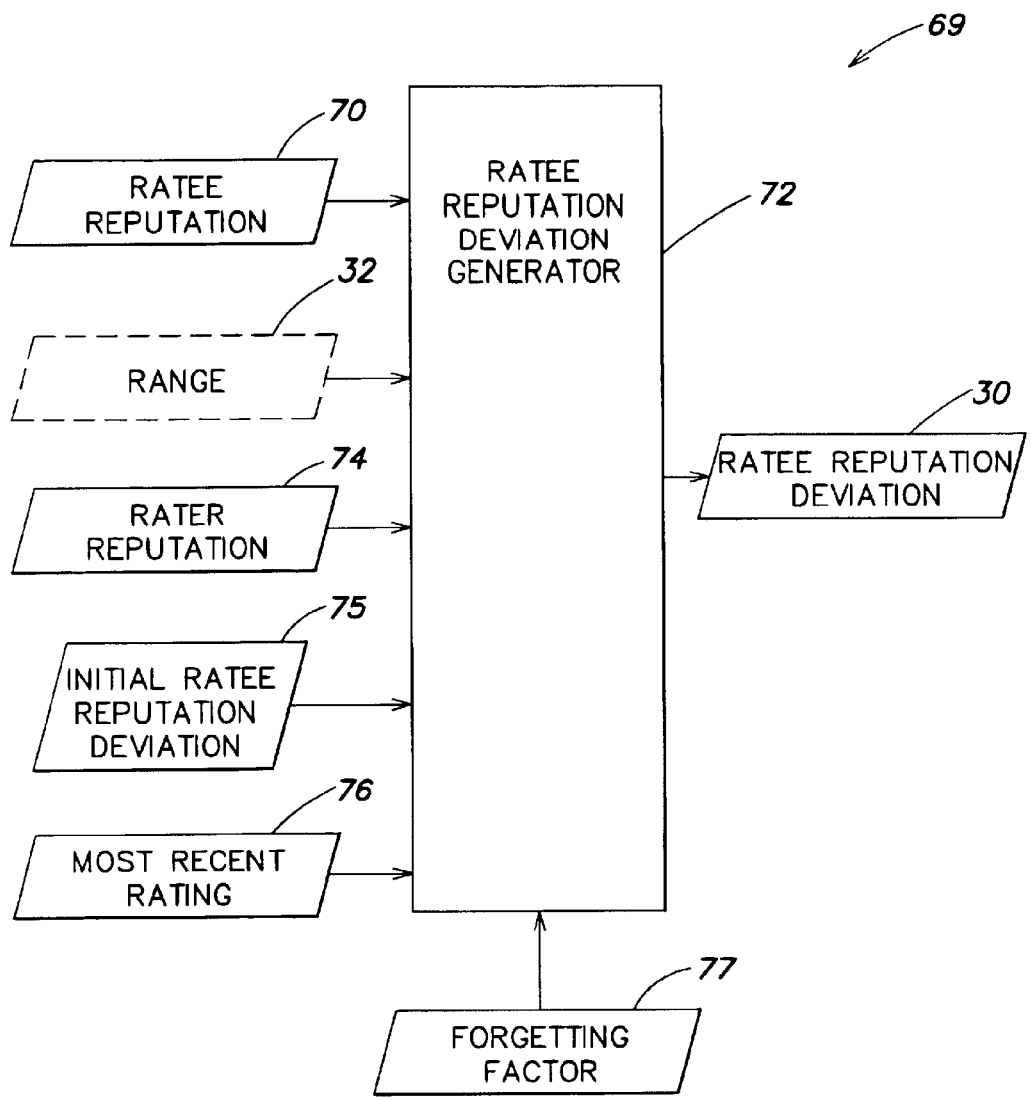
FIG. 6 is a data flow diagram illustrating an example embodiment of a system for to generating a ratee reputation deviation of an entity.

FIG. 6 is a data flow diagram illustrating an example embodiment of a system 69 for recursively generating the ratee reputation deviation 30 of a rated entity. Similarly to as described above in relation to recursively determining a rater reputation, determining a ratee reputation deviation recursively saves computational space and time, particularly as the number of provided ratings for the rated entity grows.

The ratee reputation deviation generator 72 may receive as input a ratee reputation 70, a rater reputation 74, an initial ratee reputation deviation 75, a most recent rating 76 and a forgetting factor 77. The ratee reputation deviation generator 72 may also receive the range 32.

The ratee reputation 70 is the ratee reputation determined from the most recent rating 76 of the rated entity, for example, by applying Equation 1 as disclosed in the Zacharia thesis, or by applying a variation of Equation 1, where the rater reputation is determined in accordance with Equation 15 or a variation thereof, as described above in relation to FIG. 2. The initial ratee reputation deviation 75 is the ratee reputation deviation of the rated entity before the most recent rating 76 was provided. The rater reputation 74 is the rater reputation of an entity that provided the most recent rating 76. The ratee reputation generator 72 may generate from these inputs the ratee reputation deviation 30 that represents a reliability of the rated entity's ratee reputation.

Optionally, the ratee reputation deviation generator 72 also may receive a minimum allowed rater reputation deviation and compare it to the determined rater reputation deviation 30. If the minimum deviation is greater than deviation 30, then the rater reputation deviation 30 may be set equal to the minimum allowed rater reputation.

Accordingly, the ratee reputation deviation generator 72 may generate the ratee reputation deviation 30 by applying the following equation:

$$(RD_i^{ratee})^2 = \max([RD_{min}^{ratee}]^2, [F \cdot (RD_{i-1}^{ratee})^2 + (R_i^{rater} (W_i - E_i^{rater,past}))^2]/T_o),$$ Equation 19 where $RD_{min}^{ratee}$ is a minimum allowed rater reputation deviation, F is the forgetting factor 172, $RD_{i-1}^{ratee}$ is the initial ratee reputation 75, $R_i^{rater}$ is the rater reputation 74, $W_i$ is the most recent rating 76, $T_0$ is an effective number of reputation determinations, $E_i^{rater,past}$ is the expected rating, and $RD_i^{ratee}$ is the resulting ratee reputation deviation 30. The expected rating may be calculated by applying Equation 2 as described in the Zacharia thesis. The forgetting factor is a constant having a value <1 such that older ratings have less weight in determining the resulting ratee reputation deviation than more recent ratings. $T_o$ may be derived from F by applying the following equation:

$$T_o = \sum_{i=0}^{\infty} F^i = \frac{1}{1-F}.$$ Equation 20:

Optionally, the effective number of determined reputations may be used to determine the change rate factor described above by setting $C = T_0$.

Other statistical methods may be used to determine a reliability of a ratee reputation. For example, a forgetting factor may not be applied, or an average deviation may be determined for all determined ratee reputations of the rated entity, or such an average deviation may be calculated with each ratee reputation weighted according to how recent the ratee reputation was determined.

In an aspect of recursively determining a ratee reputation deviation of a rated entity, for example, by applying Equation 19, an original ratee reputation deviation, $RD_i^{ratee}$, is initialized to a maximum allowed value for a ratee reputation deviation. Such a maximum value may be predetermined. Consequently, a rated entity's ratee reputation deviation has its highest value before the rated entity is rated by other entities. Assigning a maximum value to an original ratee reputation deviation prevents an entity with a high ratee reputation deviation from creating a new identity as a new entity and beginning with a more desirable lower ratee reputation deviation.

Equation 19 may be considered a recursive estimation algorithm of Recursive Least Squares (RLS) with a forgetting factor of F. Equation 19 estimates recursively an average square deviation of an actual rating from an expected (i.e., estimated) rating described in more detail below in relation to FIGS. 8 and 9. For more information regarding Recursive Least Squares, please refer to Chapter 9 of "Lecture Notes and Non-Linear and Non-Stationary Time Series Analysis," by H. Madsen and J. Holst, Institute of Mathematical Modeling (IMM), Technical University of Denmark, Lyngby, Denmark, 1998 (hereinafter the Madsen text), the contents of which is herein incorporated by reference in its entirety.

Other statistical methods may be used to determine a reliability of a ratee reputation. For example, a forgetting factor may not be applied, or an average deviation may be determined for all determined ratee reputations of the rated entity, or such an average deviation may be calculated with each ratee reputation weighted according to how recent the ratee reputation was determined.

The ratee reputation deviation generator 72 may be implemented as software, hardware, firmware or any combination thereof. The ratee reputation deviation generator 72 may reside on a single machine (e.g., a computer), or may be modular and reside on multiple interconnected (e.g., by a network) machines. Further, on each of the one or more machines that include the ratee reputation deviation generator 72 or modules thereof, the generator 72 or modules may reside in one or more locations on the machine. For example, different portions of the ratee reputation deviation generator 72 or modules may reside in different areas of memory (e.g., RAM, ROM, disk, etc.) on a computer.

Figure 18:
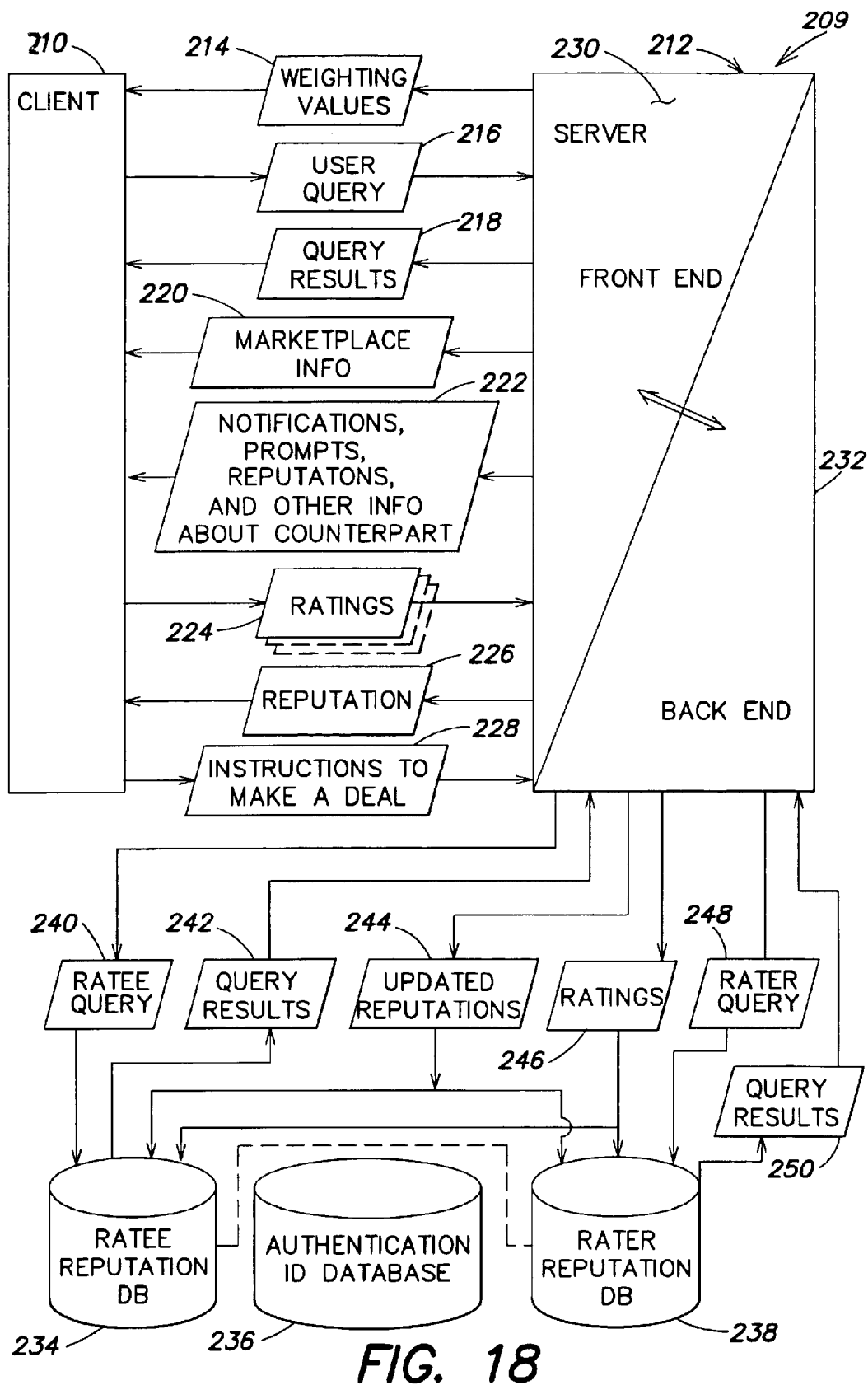
FIG. 18 is a data flow diagram illustrating an example system architecture for implementing the methods and systems of FIGS. 2–17.

The range 32 and the forgetting factor 77 may be constants stored in a reputation database or similar data structure as described in more detail in relation to FIG. 18. The ratee reputation 70, the rater reputation 74, and the initial ratee reputation deviation 75 also may be stored in the reputation database or similar structure. The ratee reputation deviation generator 72, in response to receiving the most recent rating 76, may access the reputation database or similar structure to generate the ratee reputation deviation 30 as described above. The ratee reputation deviation 30 then may be stored in the reputation database or similar structure for later access.

System 69 is merely an example embodiment of a system for generating a ratee reputation deviation. Such an example embodiment is not meant to limit the scope of the invention and is provided merely for illustrative purposes, as any of a variety of other systems for determining a ratee reputation deviation may fall within the scope of the invention.

III. Determining a Rater Reputation Deviation

In addition to having an estimate of the reliability of the ratee reputation, for example, the ratee reputation deviation 30, it may be desirable to have an estimate of the reliability of the rater reputation of an entity that is providing a rating. Such a reliability may be estimated by calculating of a rater reputation deviation. Similarly to as described above in relation to ratee reputation deviation, computational space and time may be saved by calculating a rater reputation deviation recursively, particularly as the number of ratings of other entities provided by the first entity increases.

Accordingly, a rater reputation deviation may be determined recursively by applying the following equation:

$$(RD_j^{rater})^2 = \max([RD_{min}^{rater}]^2, [F \sim (RD_{j-1}^{rater})^2 + R_{scaled}^2]/T_0),$$ Equation 21 where $RD_{min}^{rater}$ is a minimum allowed rater reputation deviation, $RD_{j-1}^{rater}$ is an initial rater reputation deviation, $RD_j^{rater}$ is the resulting rater reputation deviation, and the other symbols are as described above.

Equation 21, and variations thereof, estimate recursively an average square deviation of a rater reputation of an entity from an expected (i.e., estimated) rater reputation. For each recursive estimate, the initial rater reputation deviation, $RD_{j-1}^{rater}$, may be weighted by the forgetting factor, F, and the average square deviation may be divided by the effective number of determined reputations, $T_0$. Such recursive estimation is described in more detail in chapter 9 of the Madsen text.

Other statistical methods may be used to determine a reliability of a rater reputation. For example, a forgetting factor may not be applied, or an average deviation may be determined for all determined rater reputations of the rating entity, or such an average deviation may be calculated with each rater reputation weighted according to how recent the rater reputation was determined.

In an aspect of recursively determining a ratee reputation deviation of a first entity, for example, by application of Equation 21, an original rater reputation deviation, $RD_j^{rater}$, is initialized to a maximum value. This maximum value may be predetermined. Consequently, a first entity's rater reputation deviation has its highest value before the first entity provides a first rating of another entity. Assigning a maximum value for the rater reputation deviation prevents a first entity with a high rater reputation deviation from creating a new identity as a new entity and beginning with a lower rater reputation deviation.

Figure 7:
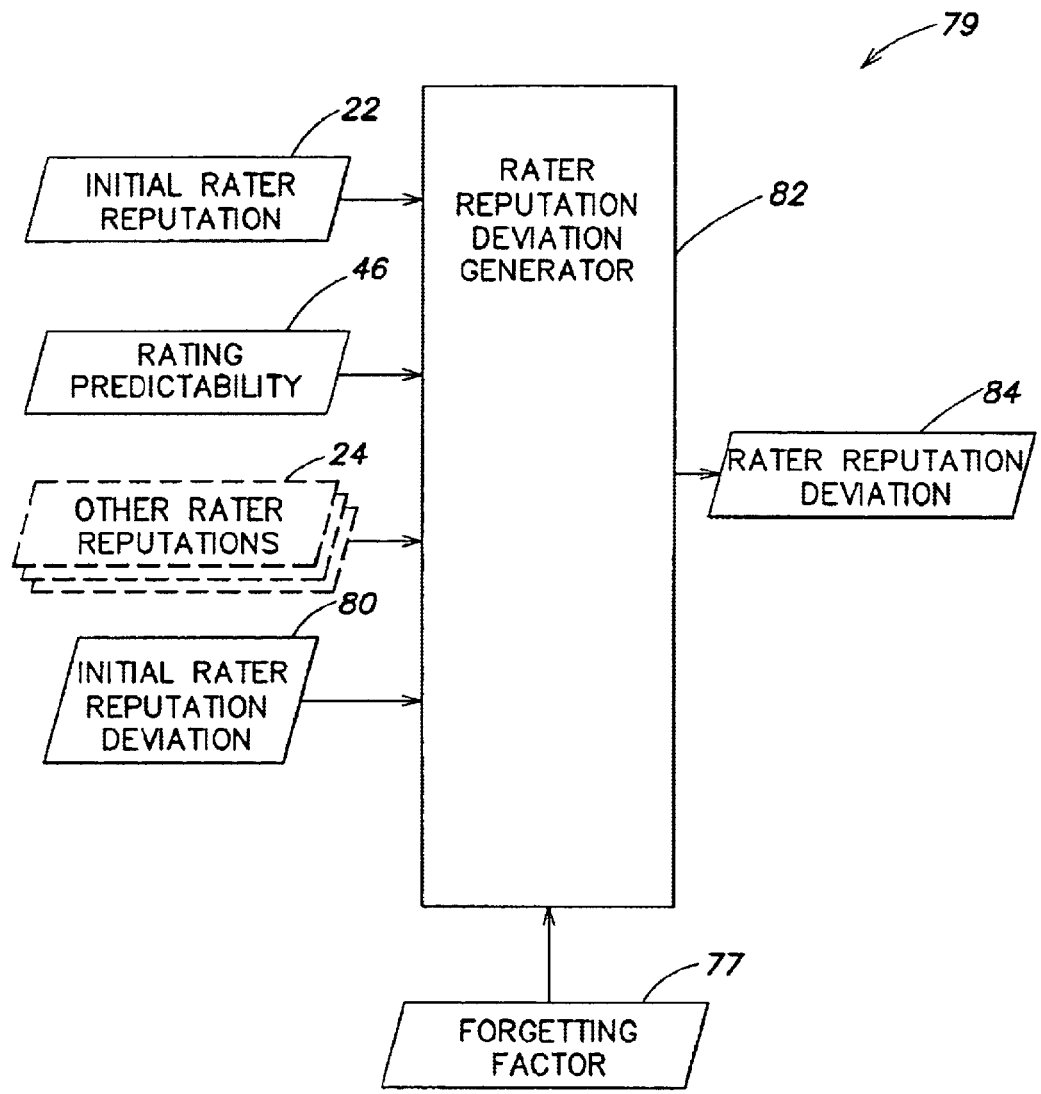
FIG. 7 is a data flow diagram illustrating an example embodiment of a system for generating a rater reputation deviation of an entity.

FIG. 7 is a data flow diagram illustrating an example embodiment of a system 79 for generating a rater reputation deviation. A rater reputation deviation generator 82 may receive as input an initial rater reputation 22, a rating predictability 46, an initial rater reputation deviation 80 and a forgetting factor 77. Rater reputation deviation generator 82 also may receive other rater reputations 24.

The rater reputation deviation generator 82 may generate the rater reputation deviation 84 from inputs 22, 24, 46 and 80. Alternatively, in place of inputs 22, 24 and 46, deviation generator 82 may receive the scaled reputation modification as input and generate the rater reputation deviation 84 in accordance with Equation 21 or variations thereof.

Optionally, the rater reputation deviation generator 82 may receive a minimum allowed rater reputation deviation, $RD^{rater}_{min}$, and compare it to the determined rater reputation deviation 84. If the minimum deviation is greater than deviation 84, then the rater reputation deviation 84 may be set equal to the minimum allowed rater reputation.

The rater reputation deviation generator 82 may be implemented as software, hardware, firmware or any combination thereof. The rater reputation deviation generator 82 may reside on a single machine (e.g., a computer), or may be modular and reside on multiple interconnected (e.g., by a network) machines. Further, on each of the one or more machines that include the rater reputation deviation generator 82 or modules thereof, the generator 82 or modules thereof, the generator 82 or modules may reside in one or more locations on the machine. For example, different portions of the rater reputation deviation generator 82 may reside in different areas of memory (e.g., RAM, ROM, disk, etc.) on a computer.

The forgetting factor 77 may be stored as a constant in a reputation database or similar data structure as described below in relation to FIG. 18. The initial rater reputation 22, the rating predictability 46, the other rater reputations 24 and the initial rater reputation deviation 80 also may be stored in the reputation database or similar data structure. In response to receiving the rating predictability 46, the rater reputation deviation generator 82 may access the reputation database or similar data structure to access and retrieve values 22, 24, 80 and 77, and generate rater reputation deviation 84. The rater reputation deviation 84 then may be stored in the reputation database or similar structure for later access.

System 79 is merely an example embodiment of a system for generating a rater reputation deviation. Such an example embodiment is not meant to limit the scope of the invention and is provided merely for illustrative purposes, as any of a variety of other systems and components for determining a rater reputation deviation may fall within the scope of the invention.

IV. Determining a Ratee Reputation Using a Rater Reputation

If a rater reputation is determined for a first entity, and the first entity provides a first rating of a rated entity, the rater reputation and the first rating may be used to determine, at least in part, a ratee reputation of the rated entity.

Accordingly, provided herein is a method and system for determining a ratee reputation of a rated entity based at least in part on one or more ratings of the rated entity provided by one or more entities and the rater reputations of these one or more entities.

In one embodiment of determining a ratee reputation, the ratee reputation of a rated entity is determined by averaging all of the ratings provided by other entities for the rated entity, and by weighting each rating with the rater reputation of the entity that provided the rating, to produce a weighted average. Accordingly, a ratee reputation may be determined by applying the following equation:

$$R^{ratee} = \frac{\sum_{j=1}^{n}[W_j \cdot R_j^{rater}]}{\sum_{j=1}^{n} R_j^{rater}},$$

Equation 22:

where $W_j$ is a rating supplied, $R_j^{rater}$ is the rater reputation of the entity who provided the rating $W_j$.

In generating such a weighted average, each rating may be further weighted with a positive function of the time at which the rating was provided. For example, the earlier the rating is provided, and thus the further away in time from when the ratee reputation is being determined, the lower the weighting of the rating. Optionally, each rating may be placed in a temporal order according to the time at which the rating was provided, and each rating may be weighted according its position in this order. Further, time may be divided into a number of intervals, and the temporal intervals may be placed in a temporal order. A rating then may be weighted according to the position of the temporal interval in the temporal order.

Similar to as described above in relation to determining a rater reputation, temporally weighting each rating represents the principle that an entity's ratee reputation may change over time. Thus, more recent ratings should be given more weight than older ratings in determining the ratee reputation of an entity. Accordingly, a ratee reputation may be determined by applying the following equation:

$$R^{ratee} = \frac{\sum_{j=1}^{n}[W_j \cdot R_j^{rater} \cdot f(j)]}{\sum_{j=1}^{n} R_j^{rater} \cdot \sum_{j=1}^{n} f(j)},$$

Equation 23:

where f(j) is a temporal function such as, for example, Equation 12, above. Other weightings and combinations of weightings may be applied to a rating to determine a ratee reputation of an entity.

Determining a ratee reputation of an entity by averaging ratings may become more cost prohibitive as the number of ratings provided by other entities for the first entity increases.

Accordingly, in another embodiment of determining the ratee reputation of an entity, the ratee reputation may be determined recursively. Similarly to as described above in relation to determining a rater reputation, determining the ratee reputation recursively saves computational space and time, particularly as the number of ratings provided for the rated entity increases.

A recursive determination may include: providing a previously determined ratee reputation (i.e., an initial ratee reputation) of the entity; determining a ratee reputation adjustment (which may be a positive or negative value) based on a received rating, and adding the reputation adjustments to the previously determined rater reputation.

Figure 8:
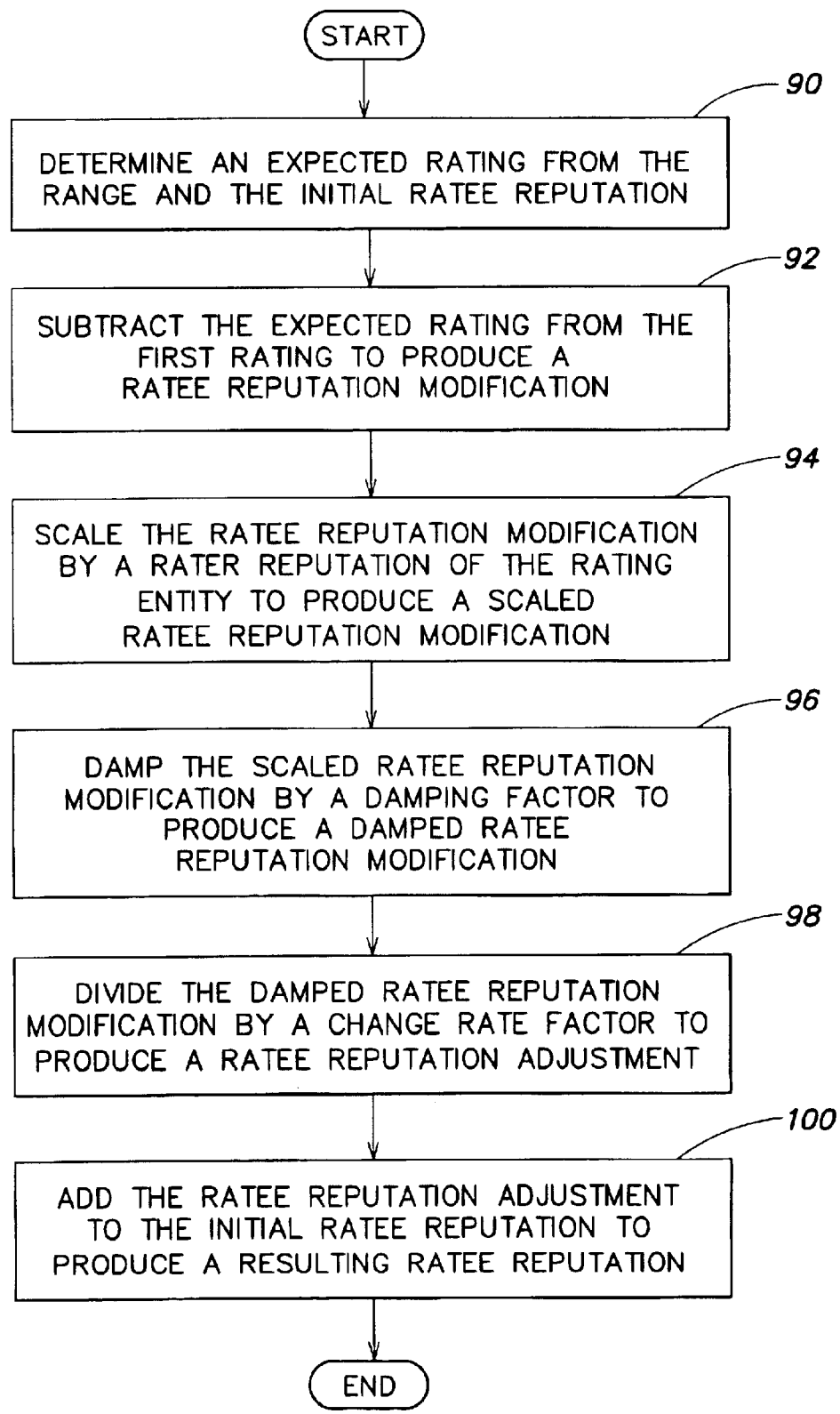
FIG. 8 is a flowchart illustrating an example embodiment of a method of generating a ratee reputation of an entity.

FIG. 8 is a flow chart illustrating an example implementation of a method of recursively determining a ratee reputation of an entity. In Act 90, an expected rating may be determined from the range and the ratee's initial reputation. An expected rating may be determined by applying Equation 4 or a variation thereof.

Next, in Act 92, the expected rating may be subtracted from the first rating to produce a ratee reputation modification. The ratee reputation modification may be produced as described in relation to Equation 23 below.

Next, in Act 94, the ratee reputation modification may be scaled by a rater reputation of the rating entity to produce a scaled ratee reputation modification. This rater reputation may be the resulting rater reputation generated according to one of the methods described in relation to FIGS. 2 and 3, or a variation thereof.

Combining Acts 92 and 94, the scaled ratee reputation modification may be produced by applying the following equation:

$$R_i^{scaled} = R_i^{rater} \cdot (W_i - E_i),\qquad \text{Equation 24}$$

where $R_i^{rater}$ is the rater reputation, $W_i$ is the first rating, $E_i$ is the expected rating, and $W_i - E_i$ is the ratee reputation modification.

Next, in Act 96, the scaled ratee reputation modification may be damped by a damping factor to produce a damped ratee reputation modification. The damped ratee reputation modification may be produced by applying the following equation:

$$R_i^{damped} = \text{damp}(R_{i-1}^{ratee}) \cdot R_i^{scaled},\qquad \text{Equation 25}$$

where $R_{i-1}^{ratee}$ is the initial ratee reputation, and $\text{damp}(R_{i-1}^{ratee})$ is the damping factor. Optionally, the damping factor may be determined (in series or concurrently with Acts 90–94) by applying Equation 2, where the acceleration factor, a, may be predetermined to control the rate at which the ratee reputation can change.

In a next Act 98, the damped ratee reputation modification may be divided by a change rate factor to produce a ratee reputation adjustment. The change rate factor affects the rate at which the ratee reputation may change.

Next, in Act 100, the ratee reputation may be added to the initial ratee reputation to produce a resulting ratee reputation. In accordance with Acts 98 and 100, the resulting ratee reputation may be determined by applying the following equation:

$$R_i^{ratee} = R_{i-1} + \frac{1}{C} \cdot R_i^{damped},\qquad \text{Equation 26:}$$

where C is the change rate factor and $R_i^{ratee}$ is the resulting ratee reputation.

In an aspect of recursively determining a ratee reputation of an entity using one or more rater reputations, for example, by applying Equation 26, an original ratee reputation, $R_0^{ratee}$, for the entity has its lowest value before any ratings are provided for the entity. Assigning a lowest value to an original ratee reputation prevents an entity with a low ratee reputation from creating a new identity as a new entity and beginning with a higher ratee reputation.

Other methods of determining a ratee reputation may be used.

A ratee reputation of a first entity may be used for a variety of purposes, including determining whether to transact with the first entity, determining a price to pay for a good or service of the first entity and determining a price to pay for insuring a quality of a good or service of the first entity.

Figure 9:
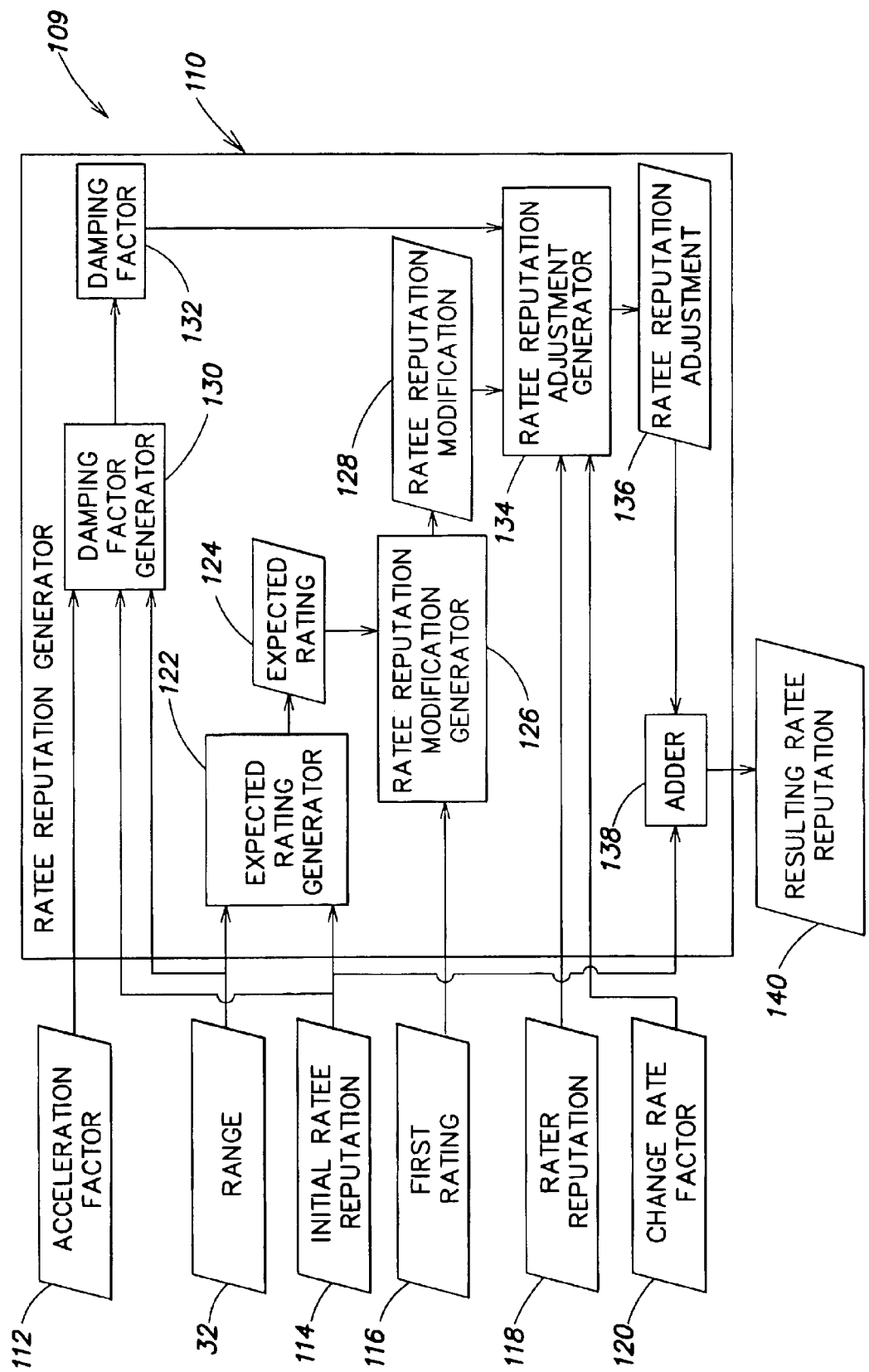
FIG. 9 is a data flow diagram illustrating an example embodiment of a system for generating a ratee reputation of an entity.

FIG. 9 is a data flow diagram illustrating an example embodiment of a system 109 for generating a resulting ratee reputation 140. A ratee reputation generator 110 may receive an acceleration factor 112, a range 32, an initial ratee reputation 114, a first rating 116, a rater reputation 118 and a change rate factor 120, and generate a resulting ratee reputation 140 as output.

The ratee reputation generator 110 may include a damping factor generator 130, an expected rating generator 122, a ratee reputation modification generator 126, a ratee reputation adjustment generator 134 and an adder 138.

The expected rating generator 122 may receive as input the range 32 and the initial ratee reputation 114, and generate an expected rating 124, for example, by applying Equation 3. The ratee reputation modification generator 126 may receive the first rating 116 and the expected rating 124, and generate the ratee reputation modification 128, for example, as described above in relation to Equation 23.

The damping factor generator 130 may receive the acceleration factor 112, the initial ratee reputation 114 and the range 32, and generate the damping factor 132, for example, by applying Equation 3 above.

The ratee reputation adjustment generator 134 may receive the ratee reputation modification 128, the damping factor 132, the rater reputation 118 and the change rate factor 120 and generate the ratee reputation adjustment 136, for example, by applying Equation 25 above.

The adder 138 may receive the initial ratee reputation 114 and the ratee reputation adjustment 136 and generate the resulting ratee reputation 140, for example, by applying Equation 26 above.

Although not shown in FIG. 9, the system 109 also may include a transaction module such as transaction module 528 described below in relation to FIG. 11. The transaction module may receive the resulting ratee reputation 140, determine whether to transact with the rated entity based on the resulting ratee reputation, and then output a value, for example, a boolean value, which indicates whether or not to transact with the rated entity.

The ratee reputation generator 110, and any combination of its components 110, 122, 126 and 134 may be implemented using software, firmware or hardware, or any combination thereof. The ratee reputation generator 110 and any components thereof may reside on a single machine (e.g., a computer), or may be modular and reside on multiple interconnected (e.g., by a network) machines. Further, on each of the one or machines that include the ratee reputation generator 110 or a component thereof, the generator 110 or component may reside in one or more locations on the machine. For example, different portions of the ratee reputation generator 110 or different portions of a component may reside in different areas of memory (e.g., RAM, ROM, disk, etc.) on a computer.

The acceleration factor 112, the range 32 and the change rate factor 120 may be stored as constants in a reputation database or similar data structure as described below in relation to FIG. 18. The initial ratee reputation 114 and the rater reputation 118 may also be stored in the reputation database or similar data structure. In response to receiving the first rating 116, the ratee reputation generator may access the reputation database and retrieve values 112, 32, 114, 116, 118 and 120 to generate the resulting ratee reputation 140 as described above. The resulting ratee reputation 140 then may be stored in the reputation database or similar structure for later access.

System 109, and components thereof, are merely example embodiments of a system for generating a ratee reputation. Such example embodiments are not meant to limit the scope of the invention and are provided merely for illustrative

Figure 10:
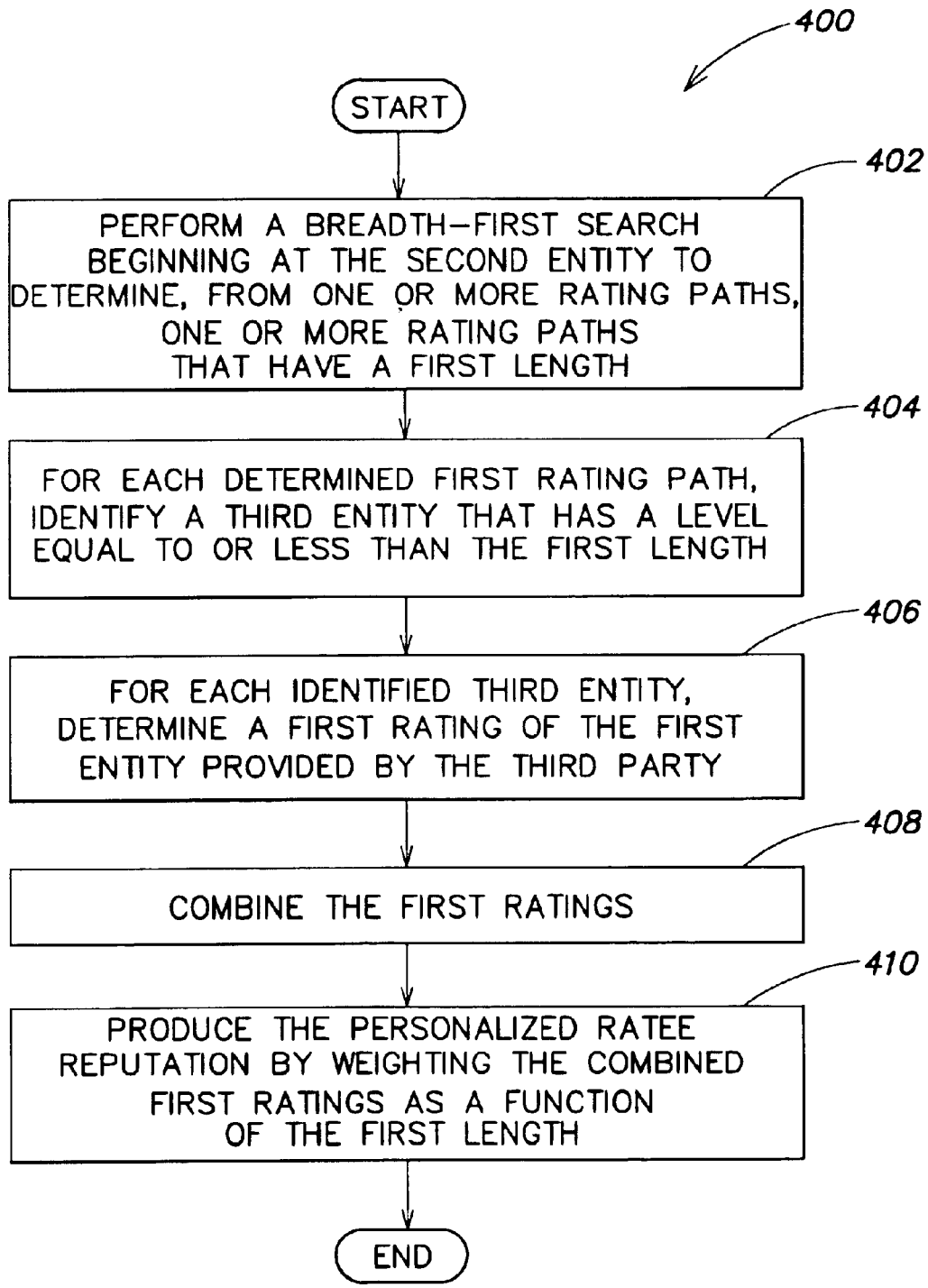
FIG. 10 is a flowchart illustrating an example embodiment of a method of determining a personalized ratee reputation.

V. Determining a Reputation of an Entity From a Perspective of Another Entity FIG. 10 is a flowchart illustrating an example embodiment of a method for determining a personalized ratee reputation. In a first Act 402, a breadth-first search is performed beginning at the second entity to determine, from one or more rating paths, one or more first rating paths that have a first length. In a next Act 404, for each determined first rating path, a third entity that has a level equal to or less than the first length is identified.

In a next Act 406, for each identified third party, a first rating of the first entity provided by the third entity is determined. For each identified third entity, it may be determined that the third entity has provided more than one rating of the first entity. For each third entity for which it has been determined that more than one rating has been provided, a most recent rating may be selected from the one or more ratings to serve as the first rating of the first entity provided by the third entity.

In a following Act 408, the first ratings are combined. The first ratings may be combined in any of a variety of ways. In one embodiment, an average of the first ratings is calculated. Calculating this first average may include, for each first rating, weighting the first rating as a function of a personalized ratee reputation of the corresponding third entity from the prospective of the second entity. This weighting may be relative to personalized ratee reputations of the other third entities from the perspective of the second entity.

The personalized ratee reputation of the third entity may be determined in any of a variety of ways. In one embodiment, one or more fourth entities that are on the first rating paths, that have provided a second rating of the third entity and that have a level equal to one less than the level of the third entity are determined. The second ratings provided by these one or more fourth entities are then combined to produce the personalized ratee reputation of the third entity from the perspective of the second entity. Combining the second ratings may include calculating an average of the second ratings. Optionally, Equation 4 or a variation thereof may be applied to combine the ratings.

In a next Act 410, the personalized ratee reputation is produced by weighting the combined first rating as a function of the first length. Act 410 may be performed by application of the following Equation:

$$R_k(n) = \frac{D \cdot \sum [R_j(n-1) \cdot W_{jk}(n)] \cdot f(n)}{\sum R_j(n-1)}, \qquad \text{Equation 27:}$$

where $R_k(n)$ is the personalized ratee reputation of an entity k from a perspective of a second entity a distance n from the entity k, $W_{jk}(n)$ is a rating provided by an entity j for the entity k, where the entity j os a distance n−1 from the second entity, $R_j(n-1)$ is the personalized ratee reputation of the entity j from the perspective of the second entity, D is a range of allowable personalized ratee reputation values, and f(n) is a function of the distances n between the second entity and the entity K (i.e., a function of the length of the rating paths between the second entity and entity K), such as, for example:

$$f(n) = \frac{1}{T^n} \qquad \text{Equation 28:}$$

where T is a constant number having a value >1.

This personalized ratee reputation may then be used to determine whether to transact with the first entity.

Weighting the personalized ratee reputation as a function of the distance between the first and second entity, where the shorter the distance the greater the value of the weighting and represents the principle that the less attenuated the rating path between a first and second entity, the more likely the second entity is to trust the determined personalized ratee reputation.

A personalized ratee reputation of a first entity may be used for a variety of purposes, including determining whether to transact with the first entity, determining a price to pay for a good or service of the first entity and determining a price to pay for insuring a quality of a good or service of the first entity.

Figure 11:
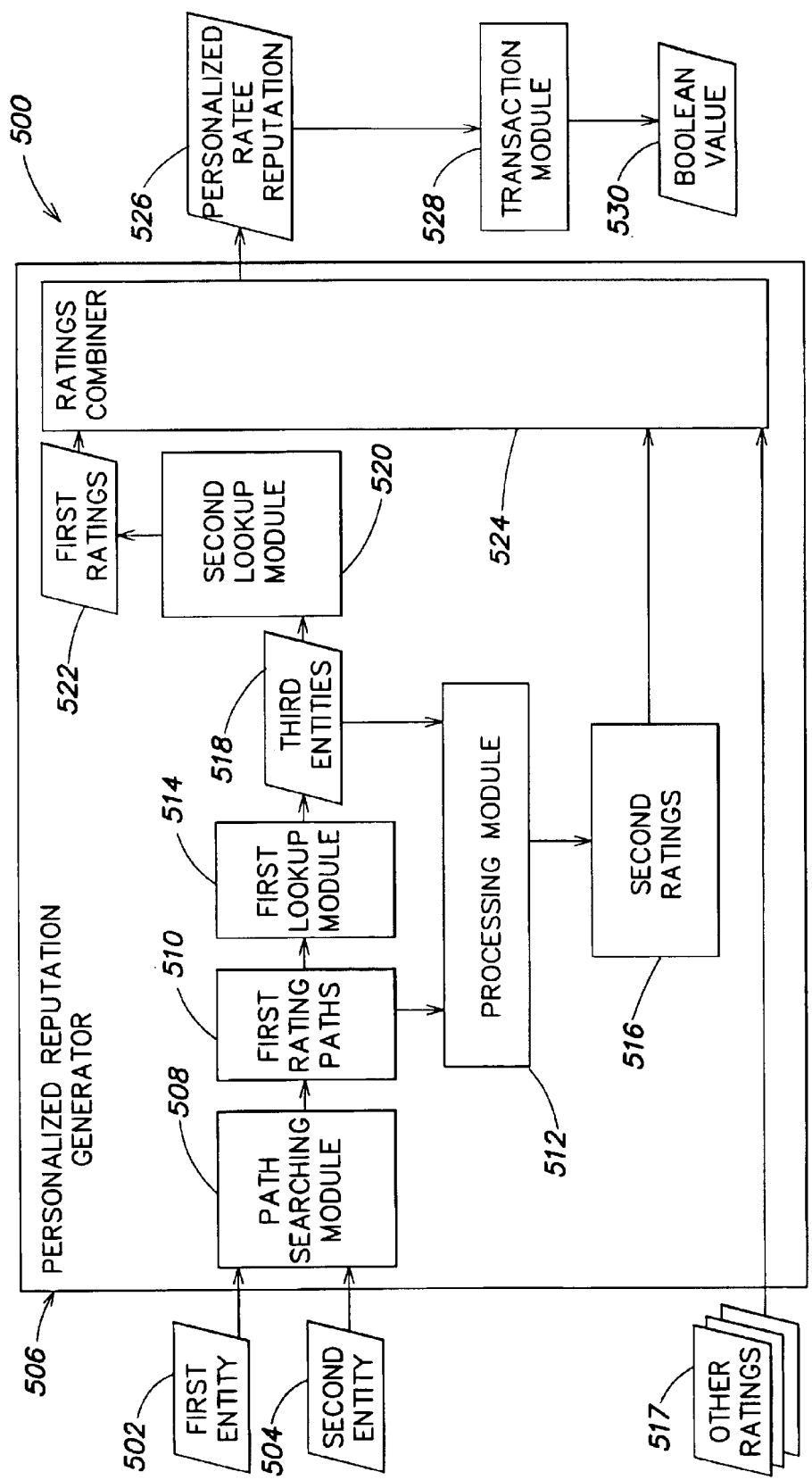
FIG. 11 is a data flow diagram illustrating an example embodiment of a system for determining a personalized ratee reputation.

FIG. 11 is a data flow diagram illustrating an example embodiment of a system 500 for determining a personalized ratee reputation of a first entity from the perspective of a second entity. The system 500 may include a personalized ratee reputation generator 506 and a transaction module 528.

The personalized ratee reputation generator 506 may include a path-searching module 508, a first look-up module 514, a processing module 512, a second look-up module 520 and a ratings combiner 524.

The path-searching module 508 may receive an indication of the first entity 502, an indication of the second entity 504 and other ratings 517, and generate a signal indicating first rating paths 510. The path-searching module may determine the first rating paths 510 as described above in relation to Act 402 of FIG. 10. The path-searching module 508 may determine the first rating path 510 by searching or looking-up rating values in a ratings database or reputation database as described in more detail below in connection to FIG. 18.

The first look-up module 514 may receive the indication of the first rating paths 510 and generate third entities 518, for example, as described above in connection to Act 404. The first look-up module 514 may determine the third entities 518 by looking up the third entities in a ratings or reputation database as described in more detail in relation to FIG. 18.

The second look-up module 520 may receive the indication of the third entity 518 as input and generate as output the first ratings 522, for example, as described above in relation to Act 406. The second look-up module 520 may determine the first ratings 522 by looking up the first ratings in a ratings or reputation database, using the third entity 518 as a look-up criteria, as described in more detail below in relation to FIG. 14.

The processing module 512 receives the indication of the first rating paths 510 and the indication of the third entities 518 and generates second ratings 516. The processing module 512 may generate the second ratings 516 as described above in relation to Act 410. The processing module 512 may determine the second ratings 516 by looking up values in the ratings or reputation database described below in relation to FIG. 14, using the first rating paths 510 and the third entities 518 as search criteria.

The ratings combiner 524 receives the first ratings 522 and the second ratings 516 and generates the personalized ratee reputation 526. The ratings combiner 524 may also receive other ratings 517, which may have been generated in a similar manner to the first ratings 522 and the second ratings 516, for example, by applying Equation 27. The ratings combiner 524 may generate the personalized rate reputation 526 as described above in relation to Act 410, and then may store the personalized ratee reputation in the reputation database or similar structure for later access.

The transaction module 528 may receive the personalized ratee reputation 526, determine whether to transact with the first entity based on the personalized ratee reputation, and then output a value, for example, a Boolean value 530, which indicates whether or not to transact with the first entity. The boolean rating 530 then may be stored in the reputation database or similar structure for later access.

The transaction module 528, the personalized reputation generator 506 and any component thereof, including the path searching module 508, the first lookup module 514, the second lookup module 520, the processing module 512 and the ratings combiner 524, may be implemented as software, hardware, firmware or any combination thereof. The module 528, generator 506 and components thereof may reside on a single machine (e.g., a computer), or may be modular and reside on multiple interconnected (e.g., by a network) machines. Further, on each of the one or more machines that include the transaction module 528, personalized reputation generator 506 or a component thereof, the generator 506, transaction module 528 or component may reside in one or more locations on the machine. For example, different portions of the personalized reputation generator 506, different portions of a component, and different portions of the transaction module 528 may reside in different areas of memory (e.g., RAM, ROM, disk, etc.) on a computer.

System 500, and components thereof, are merely example embodiments of a system for generating a personalized reputation generator and transacting based on the personalized reputation generator 506. Such example embodiments are not meant to limit the scope of the invention and are provided merely for illustrative purposes, as any of a variety of other systems and components for generating a personalized ratee reputation and transacting based thereon may fall within the scope of the invention.

VI. Determining a Temporal Estimate of the Impact of One or More Attributes on an Overall Attribute or Result The methods and systems described above for determining a rater reputation, a rater reputation deviation, a ratee reputation, a ratee reputation deviation and a personalized ratee reputation are all described in the context of a single rating being provided for each exchange between a rating entity and a rated entity.

Alternatively, in an aspect of rating an exchange, multiple ratings may be provided. For example, in an exchange involving the sale of a good, the rating entity may provide a rating for the quality of the good, a rating for the service quality, a rating for the promptness of delivery and an overall rating for the exchange. If such multiple ratings are received for a single exchange, the systems and methods described above for determining reputations and deviations may be applied to each rating independently. For example, the rater reputation and rater reputation deviation of a rating entity as a rater of the quality of the good may be determined or the ratee reputation and ratee reputation deviation of a rated entity for the promptness of its delivery of goods may be determined.

Further, if multiple ratings are received for a single exchange, and an overall rating is provided or a result based on the transaction occurs, it may be desirable to determine the impact of the one or more ratings on the overall rating or the result. It further may be desirable to determine the impact of these one or more ratings on an overall rating or results over time as ratings are received.

Accordingly, a method and system for recursively estimating the impact of one or more attributes, e.g., ratings, on a result corresponding to a qualitative assessment, e.g., an overall rating, where the qualitative assessment is based on the one or more attributes, will now be described. Determining such a recursive estimate over time allows the impacts of one or more ratings to be incrementally corrected as more ratings are received.

Although recursively estimating the impact of one or more attributes on a result is described below mostly in the context of ratings, the impacts of other types of attributes may be used. For example, one or more objective metrics may be assigned according to the quality of a good, the time of delivery, the cost of the good, etc., and the impact of this metric on a result or qualitative assessment may be determined.

A result of a qualitative assessment may be the qualitative assessment itself such as, for example, feedback, a rating or a score, or may be an action taken as a result of a qualitative assessment such as setting a price or making a selection. For example, if several entities purchase a good from a seller, and each entity provides separate ratings for the quality of the good, the service quality and the promptness of delivery, and also provides an overall rating of the seller, it may be desirable to determine the impact of each rating on the overall rating. Subsequently, the impact of each rating may be applied to estimate the impact of future ratings on a future overall rating.

It may be desirable to determine recursively a temporal estimate of the impact of one or more attributes of a plurality of attributes in any of the following scenarios:

a) Determining an overall rating;

b) Setting a price of a narrowly defined service or item;

c) Determining a frequency (i.e., a selectivity ratio) that a particular entity, item or service is selected when compared with other entities items or services; and d) Determining any other rating aspect, score, or other quality assessment for an entity, item, service, or policy that can be reduced to a numerical or Boolean state.

Figure 12:
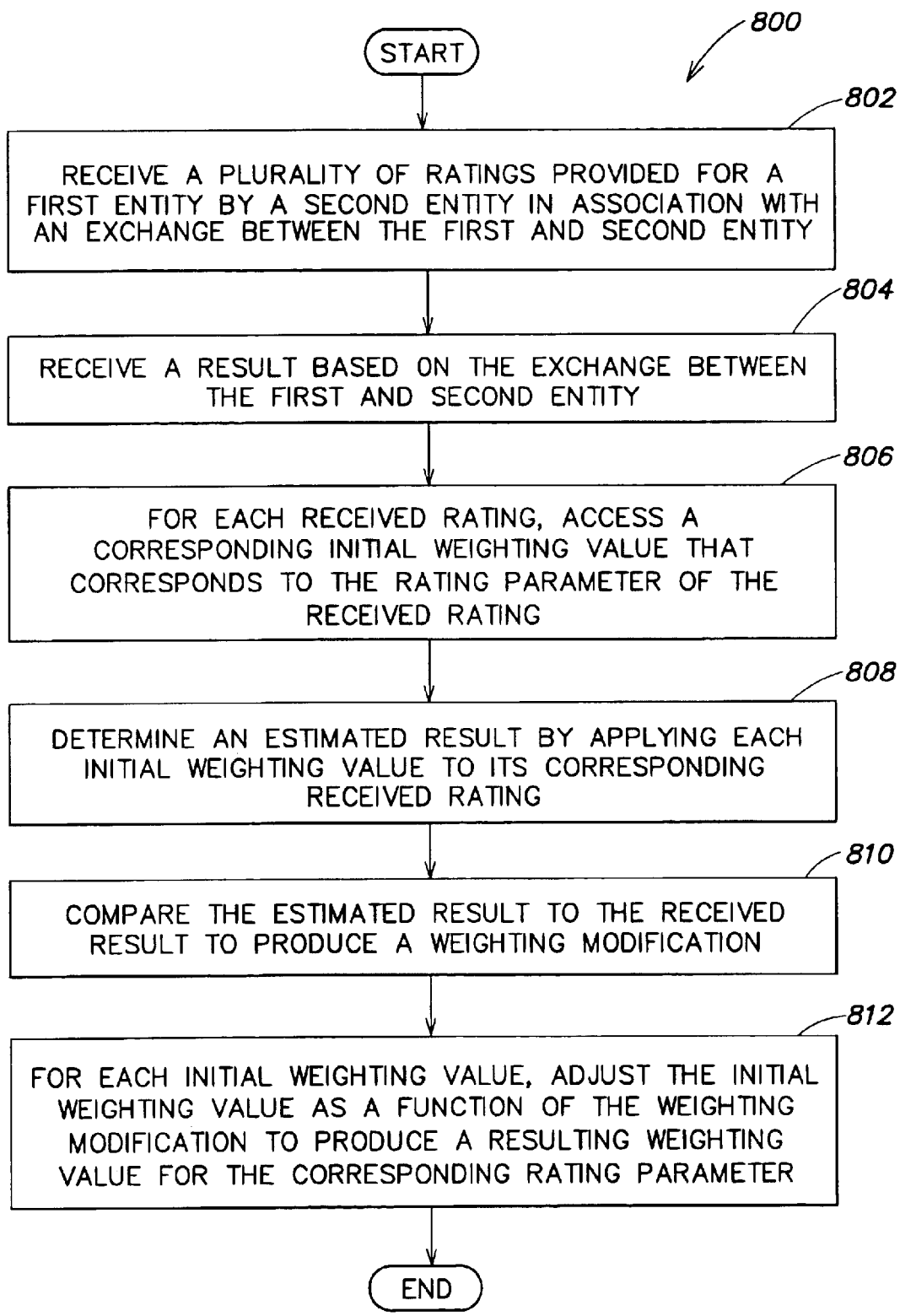
FIG. 12 is a flow chart illustrating an example embodiment of recursively estimating the impact of one or more ratings on a result.

FIG. 12 is a flow chart illustrating an example embodiment of a method 800 for estimating the impacts of a plurality of ratings on a result. In a first Act 802, a plurality of ratings provided for a first entity by a second entity in association with an exchange between the first and second entity are received. Each of these ratings corresponds to a respective rating parameter for the first entity. For example, rating parameters may include quality of service, speed of delivery and quality of a good, and the corresponding ratings may be 0.5, 0.7 and 0.2, respectively.

In a next Act 804, a result based on the exchange between the first and second entity may be received. This result may correspond to a result parameter for the first entity. For example, the result parameter may be an overall rating or a price, and the corresponding result may be 0.7 or $7.95, respectively.

In a following Act 806, for each received rating, a corresponding initial weighting value that corresponds to the rating parameter of the received rating is accessed. This initial weighting represents an estimated weight of the received rating for the rating parameter relative to received ratings for the other rating parameters in determining the result for the result parameter. For example, historically, the received ratings for the quality of a good sold by a first entity may have more weight in determining a price of the good than ratings received for the speed of delivery. For example, the speed of delivery may have a corresponding initial weighting value of 0.6, and the quality of the good may have a corresponding initial weighting value of 0.4.

Next, in Act 808, an estimated result is determined by applying each initial weighting value to its corresponding receive rating. For example, if a rating of 0.6 is received for the speed of delivery and the rating of 0.4 is received for the quality of the good, and the speed of delivery has an initial weighting value 0.3 and the quality of the good has an initial weighting value of 0.7, then the estimated result may be determined as (0.6)(0.3)+(0.4)(0.7)=0.46.

In a next Act 810, the estimated result may be compared to the received results to produce a weighting modification. For example, if the estimated result is 0.46, but the actual received result is 0.54, then the weighting modification may be 0.54−0.46=0.08.

In a following Act 812, for each initial weighting value, the initial weighting value may be adjusted as a function of the weighting modification to produce a resulting weighting value for the corresponding rating parameter. For example, the weighting modification may be added to each initial weighting value.

In an aspect of generating a resulting weighting value, the initial weighting values may be adjusted as a function of previous ratings provided for the rating parameters, for example, as described in more detail below in connection to FIG. 14.

Figure 13:
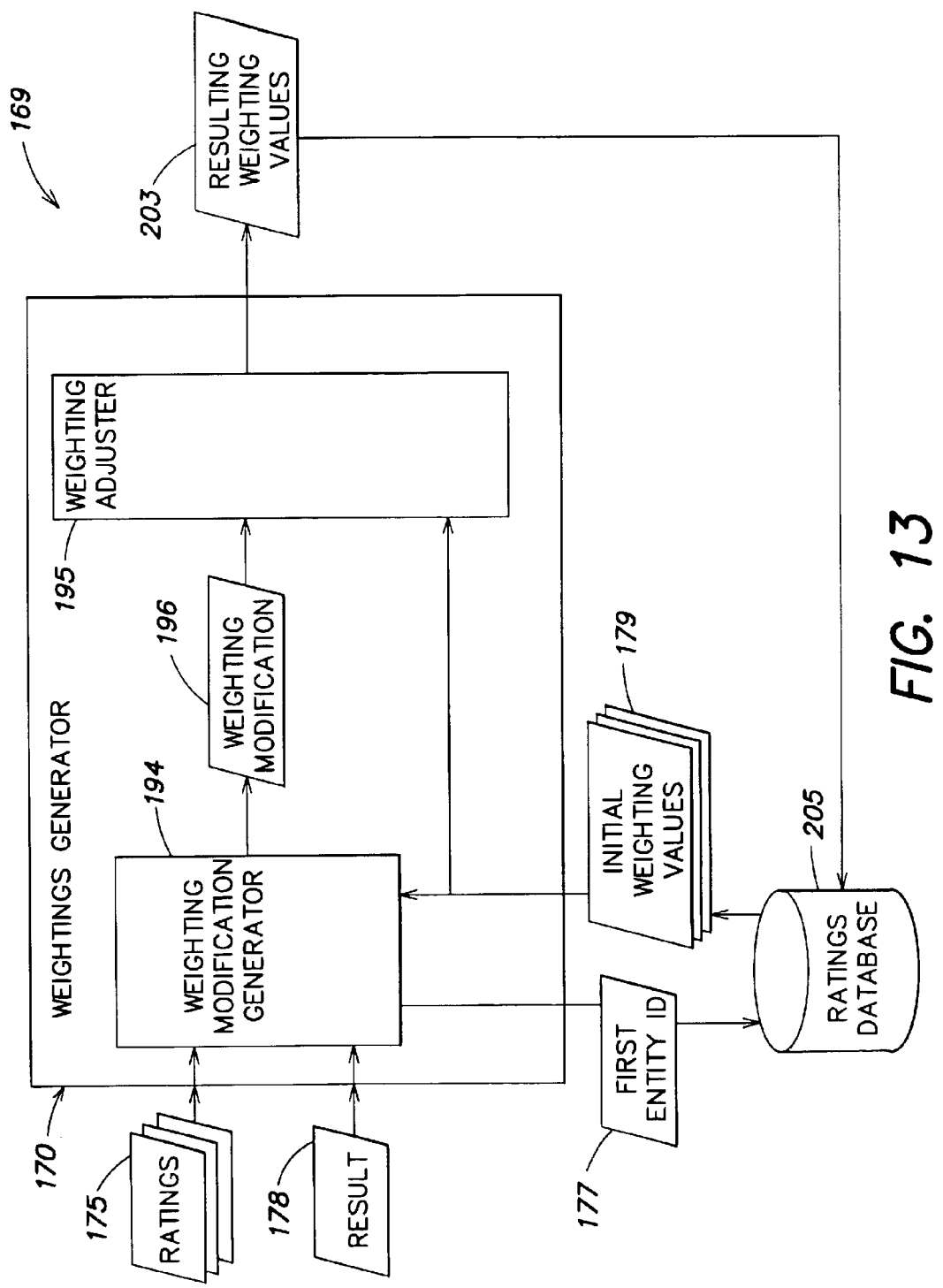
FIG. 13 is a data flow diagram illustrating an example embodiment of a system for recursively estimating the impact of one or more ratings on a result.

FIG. 13 is a data flow diagram illustrating an example embodiment of a system for estimating the impacts of a plurality of ratings on a result. The system 169 may include a ratings database 205 and a weightings generator 170 that includes a weighting modification generator 194 and a weighting adjuster 195. The ratings database 205 may be a reputation database or similar data structure such as described below in relation to FIG. 18.

The weighting modification generator 194 may receive ratings 175 and a result 178, access initial weighting values 179 corresponding to the ratings 175, and generate the weighting modification 196, as described above in Acts 802–810 of FIG. 12. The ratings 175 may be received along with a first entity ID 177 that identifies the first entity for which the ratings 175 are being provided. The weighting modification generator 194 may access the initial weighting values 179 from the ratings database 205 using the first entity ID 177. In an embodiment, the weighting modification generator 194 may generate the weighting modification 196 as described above in relation to Act 156 of FIG. 14.

The weighting adjuster 195 may receive the weighting modification 196 and the initial weighting values 179, and generate the resulting weighting values 203 as described above in relation to Act 812. In an embodiment, the weighting adjuster 195 may generate the resulting weighting values as described below in relation to Acts 158 and 160 of FIG. 14.

The weighting adjuster 194 may store the resulting weighting values 203 and the ratings database 205 for later access.

In aspects of determining recursively the impacts of two or more ratings on a result, the initial weighting values and resulting weighting values may be represented as weighting vectors or weighting matrices. Further, the plurality of provided ratings may be represented by a rating vector or rating matrix, as will be described in more detail below. Such vectors and matrices may be embodied tangibly on a medium using any of a variety of data structures, for example, an array. Accordingly, the terms "weighting array" and "rating array," as used herein, refer to a weighting vector or matrix and a rating vector or matrix, respectively, tangibly embodied on a medium as an array of other data structure.

Figure 14:
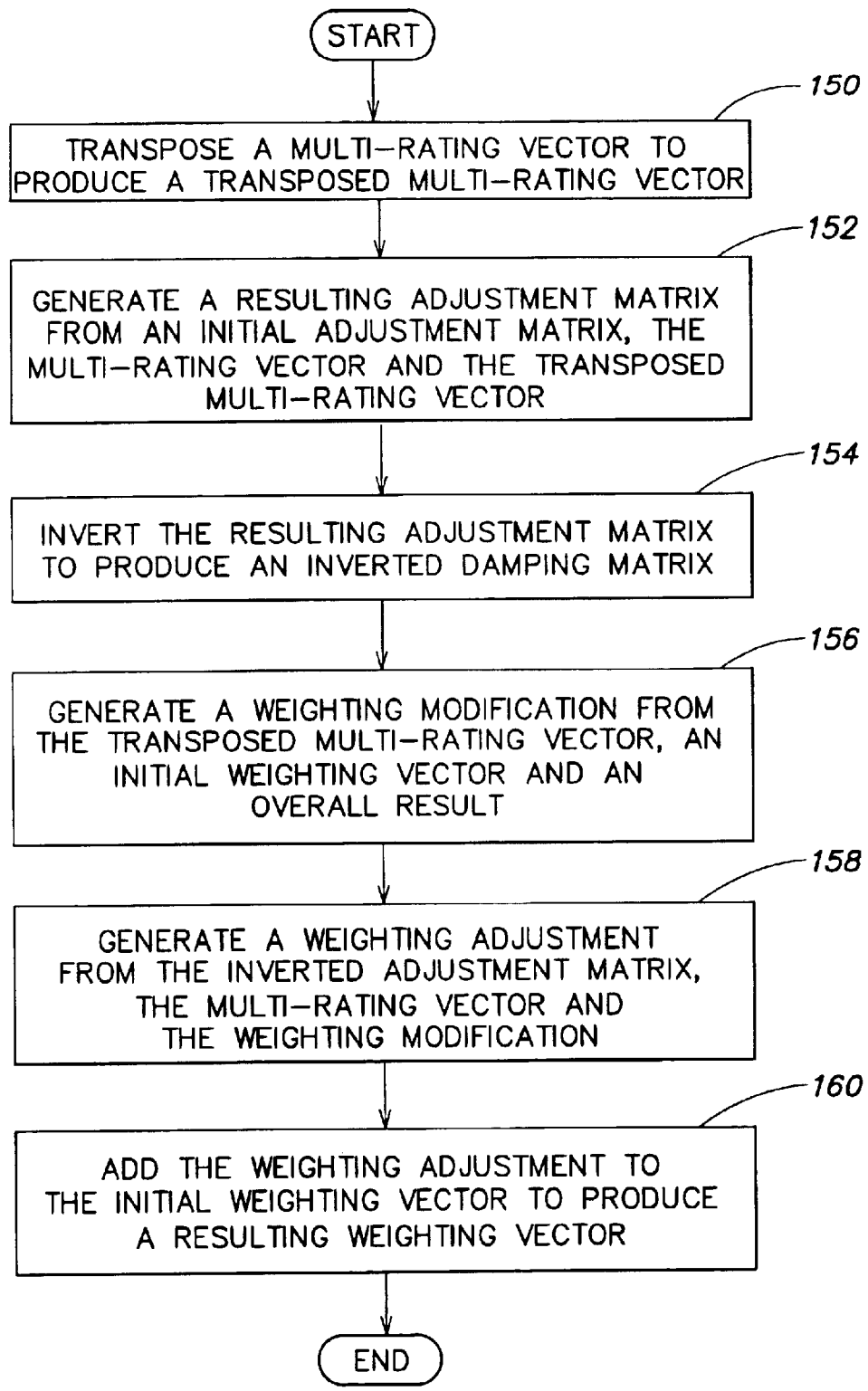
FIG. 14 is a flowchart illustrating an example embodiment of a method of generating a weighting vector for a set of multiple ratings.

FIG. 14 is a flow chart illustrating an example embodiment of a method of estimating the impacts of a plurality of ratings on a result using vectors. In Act 150, a multi-rating vector is transposed to produce a transposed multi-rating vector. Each value of the multi-rating vector may represent an attribute or sub-rating of an overall rating or other qualitative assessment.

Next, in Act 152, a resulting adjustment matrix may be generated from an initial adjustment matrix, the multi-rating vector and the transposed multi-rating vector. The resulting adjustment matrix may be generated by applying the following equation:

$$V_t = F \cdot V_{t-1} X_t X_t^T, \qquad \text{Equation 29}$$

where $V_{t-1}$ is an initial adjustment matrix, $X_t$ is the multi-rating vector, $X_t^T$ is the transposed multi-rating vector, and $V_t$ is the resulting adjustment matrix. As indicated in Equation 26, the initial adjustment matrix may be weighted by a forgetting factor, F, similar to as described above in relation to Equations 18 and 19. The forgetting factor, F, may have the affect of giving the multi-rating vector more weight than the initial adjustment matrix in determining the resulting adjustment matrix. Alternatively, the forgetting factor may be chosen such that the initial adjustment matrix has more weight in determining the resulting adjustment matrix than the multi-rating matrix.

In a next Act 154, the resulting adjustment matrix may be inverted to produce an inverted adjustment matrix. In a following Act 156, a weighting modification may be generated from the transposed multi-rating vector, an initial weighting vector and a result (e.g., an overall rating or other qualitative assessment). The weighting modification may be generated by applying the following equation:

$$Z_{mod} = Y_t - X_t^T Z_{t-1}, \qquad \text{Equation 30}$$

where $Y_{t-1}$ is the initial weighting vector, $Y_t$ is the result, and $Z_{mod}$ is the weighting modification. The weighting modification represents a difference between the result $Y_t$ and an estimated result, $X_t^T Z_{t-1}$, according to the initial weighting vector and the multi-rating vector.

Next, in Act 158, a weighting adjustment vector may be generated from the inverted adjustment matrix, the multi-rating vector and the weighting modification. Such a weighting adjustment vector may be generated by applying the following equation:

$$Z_{adj} = V_t^{-1} X_t \cdot Z_{mod} \qquad \text{Equation 31}$$

where $V_t^{-1}$ is the inverted adjustment matrix and $Z_{adj}$ is the weighting adjustment vector.

The weighting adjustment, $Z_{adj}$, further may be weighted as a function of any number of factors. For example, the weighting adjustment may be weighted as a function of the reputation of the rater that provided the multi-rating vector and overall result, or as a function of some other factor corresponding to the transaction on which the multi-rating vector and the overall result are based, e.g., a factor indicative of the significance of the transaction.

Next, in Act 160, the weighting adjustment vector may be added to the initial weighting vector to produce a resulting weighting vector. The resulting weighting vector may be generated by applying the following equation:

$$Z_t = Z_{t-1} + Z_{adj}, \qquad \text{Equation 32}$$

where $Z_t$ is the resulting weighting vector.

In an aspect of using vectors to determine weighting values, each weighting vector includes an extra weighting value such that if there is a number of rating parameters n, then the dimension of the weighting vector is n+1. This extra weighting value may be used to factor in a parameter other than a rating parameter in determining a result parameter.

For the embodiment of FIG. 14, estimated impacts of a plurality of ratings are determined for a single result. In such an embodiment, weighting vectors are applied to rating vectors and compared to a single scalar result.

Alternatively, more than one result may correspond to a plurality of ratings. If more than one result is involved, the plurality of results may be represented with a vector, and the impacts of the plurality of ratings on the plurality of results may be represented by a weighting matrix, as opposed to a weighting vector. The use of weighting matrices and a result vector as opposed to weighting vectors and a result scalar are intended to fall within the scope of the invention. Weighting vectors and result scalars are described for illustrative purposes and are not intended to limit the scope of the invention.

Equations 29–32 are derived from the minimization of the following recursive least squares (RLS) problem:

$$Z_{estimate} = \operatorname{argmin} S_t(Z_i); \quad \text{where} \qquad \text{Equation 33:}$$

$$S_t(Z_i) = \sum_{s=1}^{i} B(t, s)(Y_s - X'_s Z_i)^2;$$

$$B(t, s) = F(t)B(t-1, s); \quad \text{and}$$

where F(t) is the constant F described above in relation to FIG. 14.

The above RLS problem, the theory behind the problem, and the several matrix manipulations needed to solve equation 30 to produce equations 26–29 are described in more detail in chapter 9 of the Madsen text.

Other statistical methods for determining recursively a weighting vector for multiple attributes of a qualitative assessment, for example, variations of Equation 32, may be used.

In an aspect of determining a plurality of weighting values indicating an impact of a plurality of ratings on a result, a estimated result deviation may be determined. In an embodiment of determining a estimated result deviation, the estimated result deviation may be determined recursively. For example, the estimated result deviation may be determined by application of the following equation:

$$\left(RD_i^{weight}\right)^2 = \frac{\left[F \cdot \left(RD_{i-1}^{weight}\right)^2 + (Y_1 - X_i^T Z_i)^2\right]}{T_o} \qquad \text{Equation 34:}$$

where $RD_i^{weigh}$ is the resulting estimated result deviation, $RD_{i-1}^{weight}$ is an initial estimated result deviation, F is a forgetting factor similar to as described above in relation to Equations 18 and 19, and $T_o$ is the effective number of estimated results similar to as described above in relation to Equations 18 and 19.

Other statistical methods may be used to determine reliability of estimated results based on the estimated impacts of a plurality of ratings on a result. For example, a forgetting factor may not be applied, or an average deviation may be determined for all estimated deviations for the rated entity, or such an average deviation may be calculated with each estimated result deviation weighted according to how recent the estimated result was determined. For example, the estimated result deviation may be determined by applying the following equation:

$$RD_i^{weight} = \sum_{s=1}^{i} F^{i-s}(Y_s - X_s^T Z_s) \qquad \text{Equation 35:}$$

Figure 15:
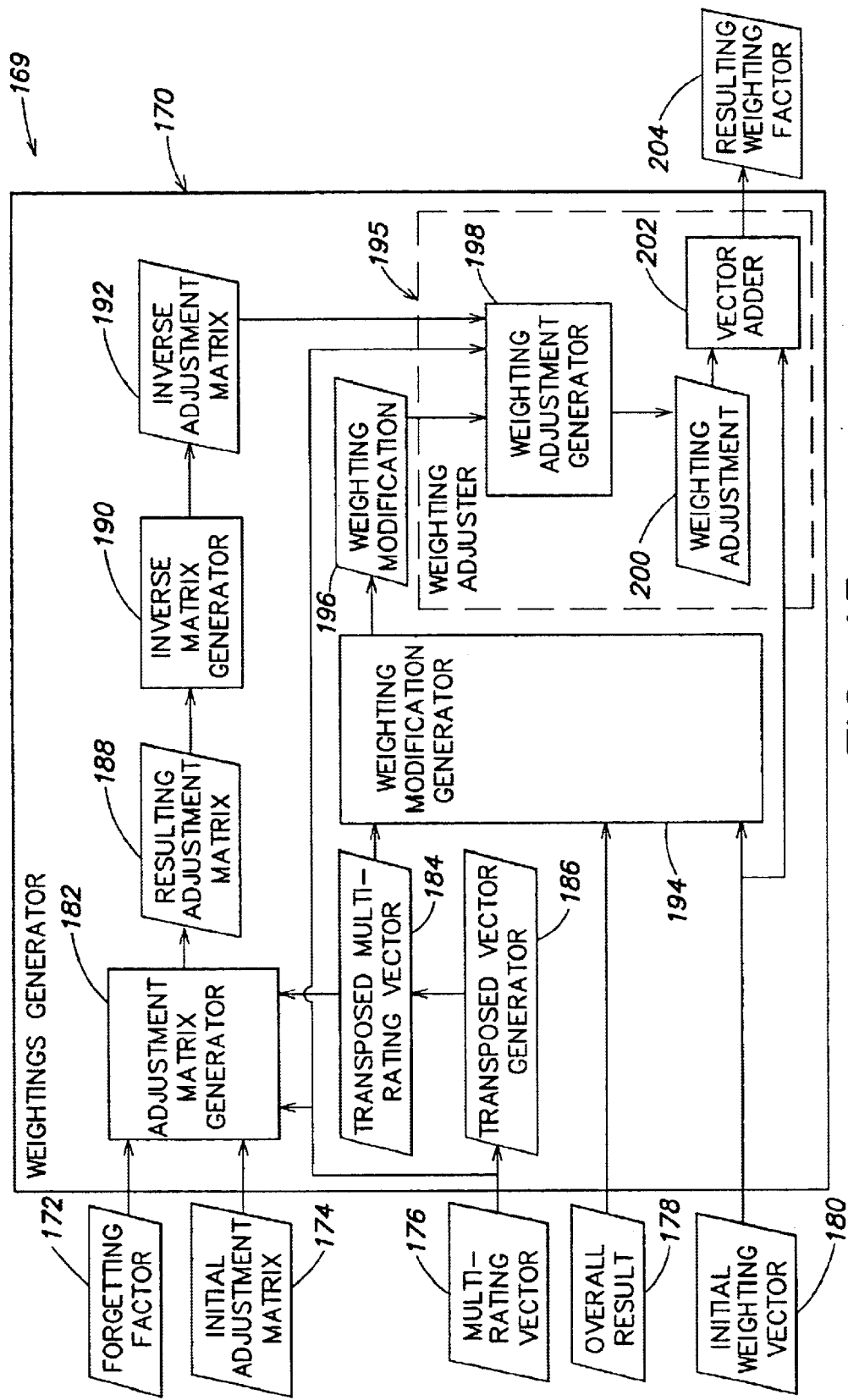
FIG. 15 is a data flow diagram illustrating an example embodiment of a system for generating a weighting vector for a set of multiple ratings.

FIG. 15 is a data flow diagram illustrating an example embodiment of the system 169 that generates a resulting weighting vector 204 to represent the estimated weights of a plurality of ratings in determining a result. The weighting generator 170 may receive as input an initial adjustment matrix 174, a multi-rating matrix 176, an overall rating (or other qualitative assessment) 178 and an initial weighting vector 180, and generate as output a resulting weighting vector 204.

The weighting generator 170 may include an adjustment matrix generator 182, an inverse matrix generator 190, a transposed vector generator 186, the weighting modification generator 194 and the weighting adjuster 195. The weighting adjuster 195 includes a weighting adjustment generator 198 and a vector adder 202.

The transposed vector generator 186 may receive as input the multi-rating vector 176 and generate the transposed multi-rating vector 184 as output. The adjustment matrix generator 182 may receive as input the transposed multi-rating vector 184 and the initial adjustment matrix 174 and generate as output a resulting adjustment matrix 188. The adjustment matrix generator 182 may also receive the forgetting factor 172 as input and generate the resulting adjustment matrix 188 based at least in part on the forgetting factor 172. The resulting adjustment matrix 188 may be generated by applying Equation 29.

The inverse matrix generator 190 may receive as input a resulting adjustment matrix 188 and generate as output an inverse adjustment matrix 192. The weighting modification generator 194 may receive as input the transposed multi-rating vector 184 and the overall rating 178 and generate as output a weighting modification 196. Optionally, the weighting modification generator 194 may generate the weighting modification in accordance with Equation 30 above.

The weighting adjustment generator 198 may receive as input the weighting modification 196, the multi-rating vector 176 and the inverse adjustment matrix 192, and generate as output the weighting adjustment vector 200. The weighting adjustment generator 198 may generate the weighting adjustment vector 200 in accordance with Equation 31 above.

The vector adder 202 may receive as input the weighting adjustment vector 200 and the initial weighting vector 180 and generate as output the resulting weighting vector 204. The vector adder 202 may generate the resulting weighting vector 204 in accordance with Equation 32.

The weighting generator 170 and any components thereof, including adjustment matrix generator 182, inverse matrix generator 190, transposed vector generator 186, weighting modification generator 194 weighting adjuster 195, weighting adjustment generator 198 and vector adder 202, may be implemented as software, hardware, firmware or any combination thereof. The weighting vector generator 170 and any components thereof may reside on a single machine (e.g., a computer), or may be modular and reside on multiple interconnected (e.g., by a network) machines. Further, on each of the one or more machines that include the weighting vector generator 169 or a component thereof, the generator 170 or component may reside in one or more locations on the machine. For example, different portions of the weighting vector generator 170 or different portions of a component may reside in different areas of memory (e.g., RAM, ROM, disk, etc.) on a computer.

The system 169, and components thereof are merely example embodiments of a system for generating a ratee reputation. Such example embodiments are not meant to limit the scope of the invention and are provided merely for illustrative purposes, as any of a variety of other systems and components for estimating the impacts of a plurality of ratings on a result may fall within the scope of the invention.

For any of the methods or systems described herein in relation to FIGS. 2–17, any number of entities may be members of a population. This population may be grouped into clusters having common properties, for example, similar demographics or preferences. Further, for a transaction having multiple parameters, for example, multiple rating parameters, the entities of the population may be grouped into any number of clusters based on the statistical similarity of the ratings they provide for the parameters. The entities may be grouped in to clusters using any of a number of known clustering algorithms, for example, a k-means clustering algorithm, an example of which is described at: http://www.cne.gmu.edu/modules/dau/stat/clustgalgs/clust5_bdy.html.

If a population of entities is grouped into clusters, reputations, estimators, deviations, and other values may be determined for each cluster separately. For example, weighting vectors and associated matrices may be generated and maintained independently for each cluster.

VII. Generating a Third Estimated Ratee Reputation By Combining a First Estimated Ratee Reputation With a Second Estimated Ratee Reputation Described above are example embodiments of systems and methods for estimating a ratee reputation. For example, determining an estimated ratee reputation of a first entity using the rater reputations of one or more entities that provided ratings for the first entity is described above in relation to FIGS. 8 and 9.

As described above, if one or more attributes are provided for a single exchange with a ratee (e.g., one or more ratings are provided by a rater), an estimated ratee reputation may be determined for each attribute. As used herein, an estimated ratee attribute reputation is an estimated ratee reputation determined for one of multiple attributes for a single exchange, as opposed to an estimated ratee reputation determined for a result or qualitative assessment associated with the single exchange.

Further, determining an estimated result by applying initial weighting values to associated attributes, e.g., received ratings, is described above in relation to Act 808 of FIG. 12. If the estimated result described in relation to Act 808 is an overall rating, then initial weighting values may be applied to associated attributes to estimate a ratee reputation of an entity.

It may be desirable to combine two or more estimated ratee reputations to produce a new estimated ratee reputation. The deviation of such a new estimated ratee reputation over time from actual received ratings may be used to determine whether the new estimated ratee reputation is more accurate than the two or more estimated ratee reputations. Accordingly, provided herein is a method and system for estimating a ratee reputation of a first entity based on multiple estimated ratee reputations of the first entity.

Figure 16:
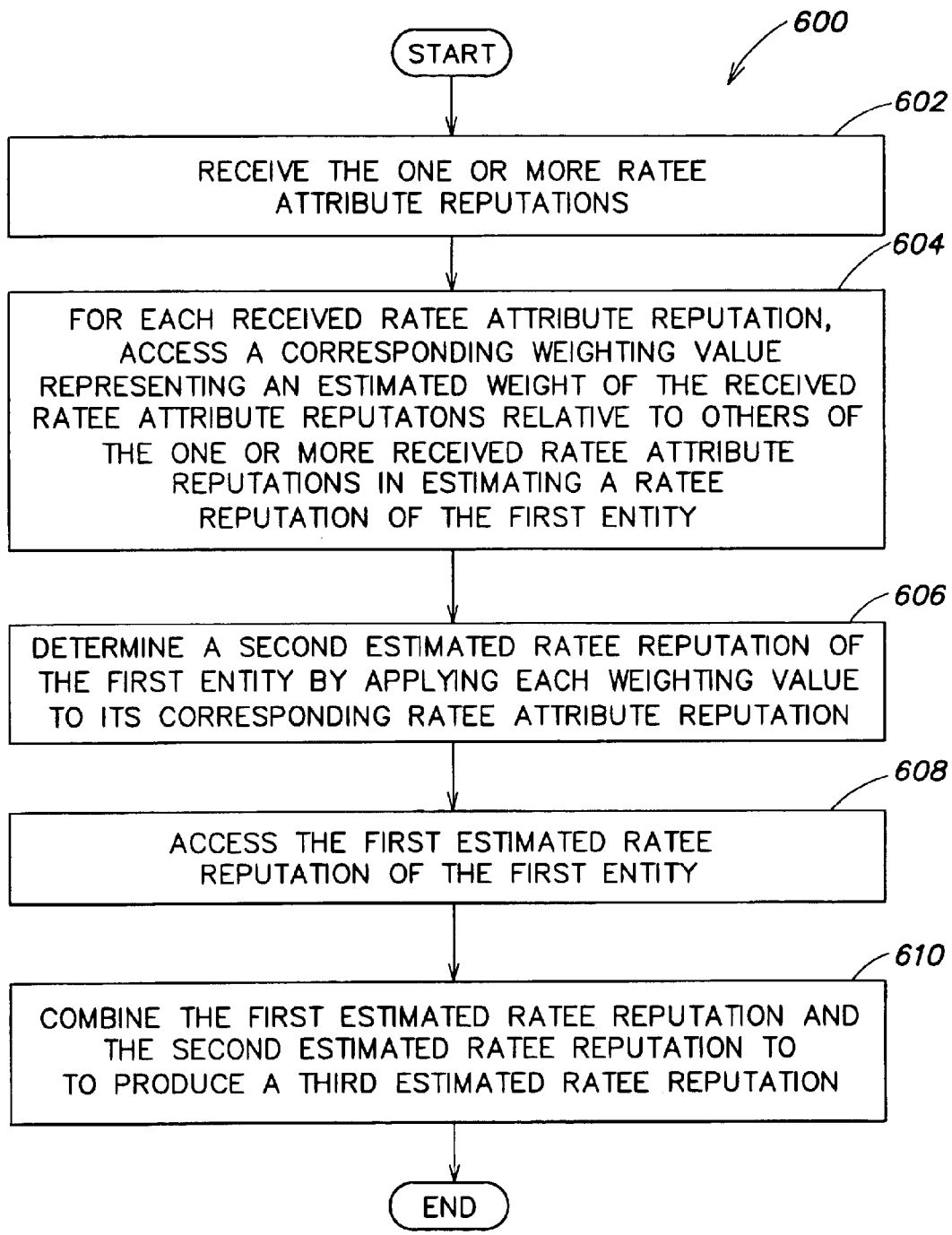
FIG. 16 is a flow chart illustrating an example embodiment of a method of combining multiple estimated reputations to produce a new reputation.

FIG. 16 is a flowchart illustrating an example embodiment of a method 600 of combining a first estimated ratee reputation of a first entity with a second estimated ratee reputation of the first entity to produce a third estimated ratee reputation. A reputation database, for example, the reputation database 726 described below in relation to FIG. 17, may store a first estimated ratee reputation and one or more ratee attribute reputations.

The first estimated ratee reputation may have been generated by combining a plurality of overall ratings, where each overall rating was provided by a different entity for a corresponding transaction. For example, the first estimated ratee reputation may be determined from the plurality of overall ratings in a similar manner to that described above in relation to FIGS. 8 and 9.

Each of the one or more ratee attribute reputations may have been generated by combining a plurality of attributes, where each attribute corresponds to a different one of the transactions. For example, each of the one or more ratee attribute reputations may be determined from the plurality of attributes in a similar manner to that described above in relation to FIGS. 8 and 9.

In Act 602, the one or more ratee attribute reputations are received. In a next Act 604, for each received ratee attribute reputation, a corresponding weighting value is accessed. The accessed weighting value represents an estimated weight of the received ratee attribute reputation relative to others of the one or more received ratee attribute reputations in estimating a ratee reputation of the first entity, similarly to as described above in relation to Act 806 of FIG. 12.

Next, in Act 606, a second estimated ratee reputation of the first entity is determined by applying each weighting value to its corresponding ratee attribute reputation. For example, the weighting values may be combined with the corresponding ratee attribute reputations similarly to as described above in relation to Act 808 of FIG. 12 and Act 156 of FIG. 14.

In a following Act 608, the first estimated ratee reputation is accessed, for example, from a database. Act 608 may be performed serially or concurrently to the sequence of Acts 602–606.

Next, in Act 610, the first estimated ratee reputation and the second estimated ratee reputation may be combined to produce a third estimated ratee reputation. For example, the average of the first estimated ratee reputation and the second estimated ratee reputation may be determined such that the third estimated ratee reputation is an average of the first and second estimated ratee reputations.

Optionally, the first and second estimated ratee reputations may be weighted by estimated ratee reputation deviations to calculate a weighted average. For example, to determine the third estimated ratee reputation, the following equation may be applied:

$$R_3 = \frac{RD_1^{rater} \cdot R_2 + RD_2^{[weight]rater} \cdot R_1}{RD_1^{rater} + RD_2^{[weight]rater}};$$ Equation 36:

where $R_1$ is the first estimated ratee reputation, $R_2$ is second estimated ratee reputation and $R_3$ is the third estimated ratee reputation. $RD_1^{rater}$ is a first estimated ratee reputation deviation corresponding to the first estimated ratee reputation and may be determined by application of Equation 21 as described above. $RD_2^{rater}$ is a second estimated ratee reputation deviation corresponding to the second estimated ratee reputation and may be determined by application of Equation 34 or 35 as described above.

As described above in relation to Equations 21, 34 and 35, for a given estimated ratee reputation, a higher estimated ratee reputation deviation represents a lower reliability of the estimated ratee reputation and, conversely, a lower estimated ratee reputation deviation represents a higher reliability of the estimated ratee reputation. Therefore, if both the first and second estimated ratee reputations were weighted according to their respective ratee reputation deviations, the ratee reputation with a higher deviation and lower reliability would be given more weight (i.e., have a greater impact) in generating the third estimated ratee reputation, which consequently would generate a less reliable third estimated ratee reputation than that defined by Equation 36.

Accordingly, in Equation 36, to weight both the first and second ratee reputations according to their respective reliabilities, the first ratee reputation is weighted by the second ratee reputation deviation, and the second ratee reputation is weighted by the first ratee reputation deviation. As a result, of the first and second ratee reputations, the ratee reputation having the higher reliability will have the greater impact on the third estimated ratee reputation.

Figure 17:
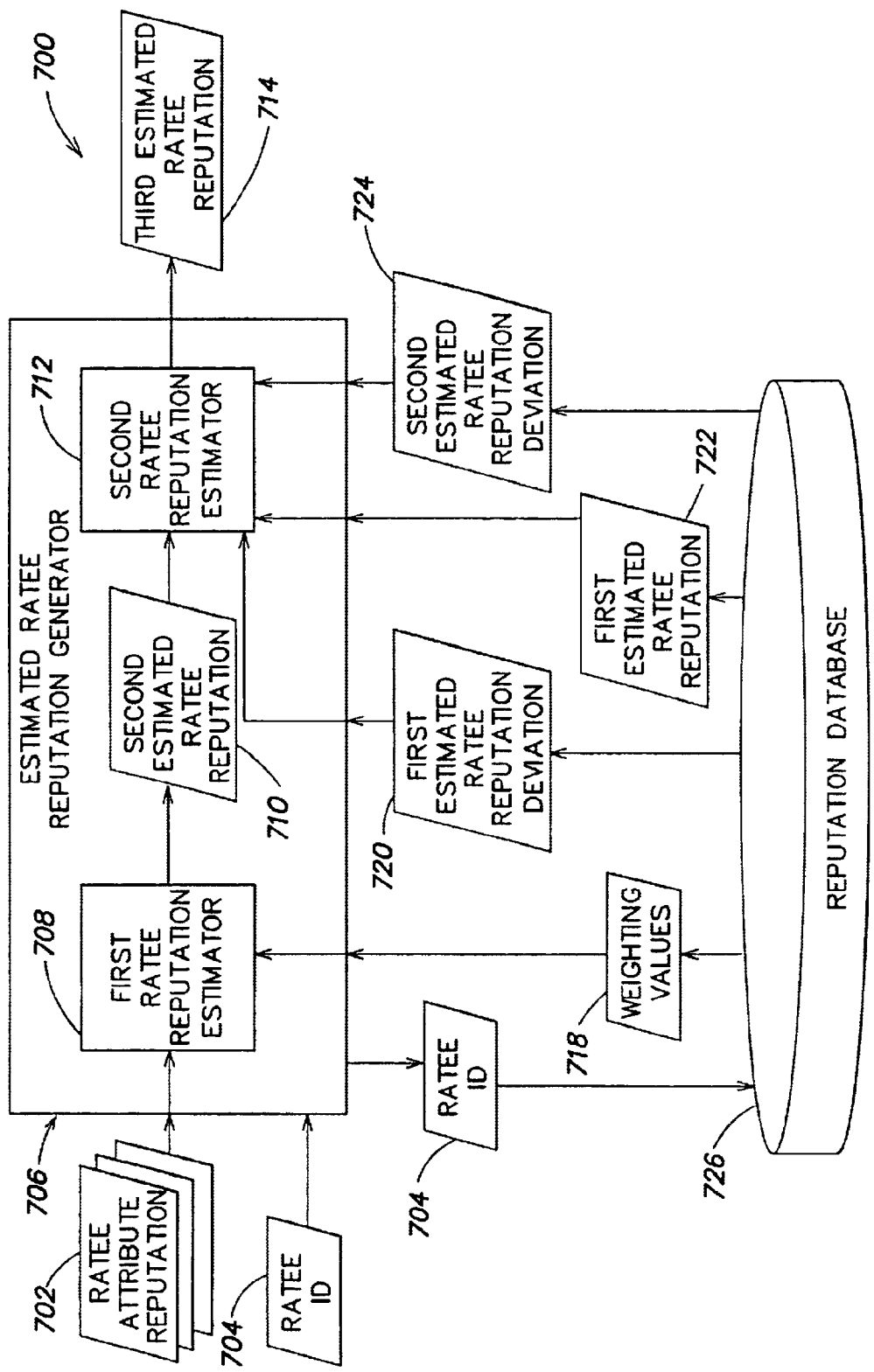
FIG. 17 is a data flow diagram illustrating an example embodiment of a system for combining multiple estimated reputations to produce a new estimated reputation.

FIG. 17 is a data flow diagram illustrating an example embodiment of a system 700 for generating an estimated ratee reputation. The system 700 may include a reputation database 726 and an estimated ratee reputation generator 706 that includes a first ratee reputation estimator 708 and a second ratee reputation estimator 712. The reputation database 726 may be a reputation database or similar data structure as described below in relation to FIG. 18.

The estimated ratee reputation generator 706 may receive ratee attribute reputations 702 and a ratee ID 704. The ratee attribute reputations 702 may be determined, as described above, from attributes corresponding to transactions with a first entity, and the ratee ID 704 may indicate the first entity. The estimated ratee reputation generator 706 may use the ratee ID 704 to access, from reputation database 726, weighting values 718, first estimated ratee reputation deviation 720, second estimated ratee reputation 722 and second estimated ratee reputation deviation 724. The estimated ratee reputation generator 706 may use values 718, 720, 722 and 724 to generate a third estimated ratee reputation 714, for example, as described above in relation to FIG. 16.

The first ratee reputation estimator 708 may receive the one or more ratee attribute reputations 702 and the weighting values 718, and generate the second estimated ratee reputation 710, for example, as described above in relation to Act 606 of the FIG. 16.

The second ratee reputation estimator 712 may receive the first estimated ratee reputation deviation 720, the first estimated ratee reputation 722, the second estimated ratee reputation deviation 724 and the second estimated ratee reputation 710, and generate the third estimated ratee reputation 714, for example, as described above in relation to Act 610 of FIG. 16.

The estimated ratee reputation generator 706, and any of a combination of its components, including first ratee reputation estimator 708 and second ratee reputation estimator 712, may be implemented using software, firmware or hardware or any combination thereof. The estimated ratee reputation generator 706 and any components thereof may reside on a single machine (e.g., a computer), or may be modular and reside on a multiple interconnected (e.g., by a network) machines. Further, on each of the one or more machines that include the estimated ratee reputation generator 706 or a component thereof, the generator 706 or component may reside in one or more locations on the machine. For example, different portions of the estimated ratee reputation generator 706 or different portions of a component may reside in different areas of memory (e.g., RAM, ROM, disk, etc.) on a computer.

System 700, and components thereof, are merely example embodiments of a system for estimating a ratee reputation. Such example embodiments are not meant to limit the scope of the invention and are provided merely for illustrative purposes, as any of a variety of other system and components for estimating a ratee reputation may fall within the scope of the invention.

VIII. System Architecture

FIG. 18 is a data flow diagram illustrating an example system architecture 209 for implementing the methods, systems and variations thereof described above in relation to FIGS. 2–17. The system 209 may include a client 210, a server 212, ratee reputation database 234, an authentication I.D. database 236 and a rater reputation database 238. The components 210, 212, 234, 236 and 238 of the system 209 may have a variety of configurations. For example, all these components may reside on a single computer, or any combination thereof may reside on a separate computer or multiple computers interconnected, for example, by a network. Further, any combination of these components may reside on separate networks, including separate LANs (Local Area Networks), MANs (Metropolitan Area Networks) and WANs (Wide Area Networks).

The ratee reputation database 234 may contain one or more entries, where each entry represents ratee reputation data for an entity. For example, an entry in the ratee reputation database may include an entity I.D., demographic information about the entity, ratings of the entity provided by other entities, a ratee reputation of the entity, a ratee reputation deviation of the entity, weighting values corresponding to attributes or rating parameters or items, goods, services, people, etc. associated with the entity, and other information regarding the entity.

The authentication I.D. database 236 may include one or more entries, where each entry represents an entity that is part of a population using a ratee reputation system, a rater reputation system, or a combination thereof. An entry in the authentication I.D. database 236 may include an I.D. of an entity, demographic information about an entity, a password for the entity, and other information regarding an entity.

The rater reputation database 238 may include one or more entries, where each entry represents data specific to an entity. For example, an entry in the rater reputation database 238 may include an entity I.D., demographic information about the entity, ratings provided by the entity, a rater reputation of the entity, a rater reputation deviation of the entity, and other information regarding the entity.

Each of the databases 234, 236 and 238 may be of any type of a variety of types of databases, including a relational database (e.g., Microsoft SQL or Oracle) that stores data as entries in tables, an object-oriented database that stores data as objects or a flat file database, where entries are stored as records and separated by delimiters. Further, each of the databases 234, 236 and 238 may each be part of single database. For example, a single database may maintain an entry for each entity, where each entry includes an I.D. of the entity, authentication data of the entity, ratings provided by the entity, ratings of the entity provided by other entities, a ratee reputation of the entity, weighting values, and a rater reputation of the entity, as well as other information.

The server 212 may include a frontend 230 and a backend 232. The frontend 230 may include a user interface and may receive and send instructions and other data to and from the client 210. The frontend 230 may then transfer and receive instructions to and from the backend 232.

The backend may determine ratee reputations, rater reputations, ratee reputation deviations, rater reputation deviations, weightings, and other metrics and values such as, for example, as described above in relation to FIGS. 2–17.

The backend 232 may also receive queries 216 submitted to the frontend 230 and translate these queries to database queries on one of the databases 234, 236 or 238. The backend 232 may also transfer updated reputations 244, ratings 246 and weightings to the various databases.

The client 210 and the server 212 may be implemented as software, firmware, or hardware, or any combination thereof. For example, the client 210 and the server 230 may be implemented as software using any of a variety of programming languages, such as Java, C and C++.

Through the client 210, an entity may submit one or more ratings 224 to the server 212. Included along with the ratings 224 may be a rater ID that identifies the rating entity and a ratee ID that identifies the entity being rated. The server 212 may then determine a ratee reputation, a rater reputation, weightings, and other information in accordance with the various techniques described above in relation to FIGS. 2–17.

For example, to determine a ratee reputation of the rated entity, the server 212 may submit a ratee query 240 to the ratee reputation database 234 and extract various data corresponding to the rated entity, including the current ratee reputation and previous ratings of the rated entity provided by other entities. This data may be sent from the ratee reputation database 234 to the server 212 as query results 242. The server 212 then may use the query results 242 and the received ratings 224 to determine a ratee reputation of the rated entity according to any of a variety of the techniques described above, then may send the ratee reputation 226 through the frontend 230 to the client 210.

The server 212 may store or persist the one or more ratings 224 and the updated ratee reputation 244 by sending to the ratee reputation database 234, for example, to an entry corresponding to the rated entity, and by sending the one or more ratings 224 and the updated ratee reputation to the rater reputation database 238, for example, to an entry corresponding to the rating entity.

Similarly, to determine a rater reputation of the rating entity, the server 212 may submit a rater query 248 to the rater reputation database 238 and extract various data corresponding to the rating entity, including the current rater reputation and previous ratings of other entities provided by the rating entity. This data may be sent from the rater reputation database 238 to the server 212 as query results 250. The server 212 then may use the query results 250 and the received ratings 224 to determine a rater reputation of the rated entity according to any of the techniques described above through the frontend 230, the server 212, then may send the determined rater reputation 226 to the client 210.

The server 212 may store the one or more ratings 224 and the updated rater reputation 244 by sending to the ratee reputation database 234, for example, to an entry corresponding to the rated entity, and by sending the one or more ratings 224 and the updated rater reputation 244 to the rater reputation database 238, for example, to an entry corresponding to the rating entity.

The server 212 may use similar techniques to access the ratee reputation database 234 and the rater reputation database 238 to determine other values as described above in relation to FIGS. 2–17, including determining ratee reputation deviations, rater reputation deviations, personalized ratee reputations, weightings, estimated results, and estimated result deviations.

For example, in response to receiving a plurality of ratings 224 and a result from the client 210, the server 212 may access the necessary values in the ratee reputation database 234 and/or the ratee reputation database 238, determine resulting weighting values, for example, as described above in relation to FIGS. 12–15, and then sending the weighting values 214 to the client 210.

Further, the server 212, through the frontend 230, may receive a user query 216 from the client 210. For example, the user query may be requesting the rater reputations of one or more entities, the ratee reputations of one or more entities, or the personalized ratee reputation of one or more entities from the perspective of a particular entity. The server 212 may convert the user query 216 into a database query, for example, a ratee query 240 or a rater query 248, and send the database query to the appropriate database. The server 212 then may send the query results 218 to the client 210.

The server 212 may be part of an on-line marketplace, for example, an agent-mediated marketplace. Accordingly, the client may request and receive marketplace information 220 from the server 230. Further, the server 212, as part of a transaction between an entity corresponding to the client 210 and a counterpart entity, may send communications 222 to the client 210. The communications 222 may include notifications pertaining to the current transaction, prompts for information from the entity corresponding to the client 210, reputations of the counterpart entity, and other information about the entity including demographic data, weighting values, etc.

During the context of an exchange between the entity corresponding to the client 210 and the counterpart entity, the client 210 may send instructions 228 to make a deal, for example, instructions to purchase a good.

The client 210 may include a user interface to allow interaction between a user and an application, for example, a reputation application or marketplace application implemented using the client 210 and server 212. The user interface may involve using CGI scripts to generate web pages in accordance with any of a variety of markup languages such as, for example, HTML, XML or SGML.

The several methods described herein, and the various embodiments thereof, including the methods and embodiments described in relation to FIGS. 2, 3, 8, 10, 12, 14, 16 and Equations 5–35, may be stored on a computer-readable medium as computer-readable signals. For each method or embodiment thereof, the computer-readable signals may define instructions that, in response to being executed on a computer, perform the method or embodiment. Each method or embodiment thereof may be implemented using software, firmware, hardware, or any combination thereof. If implemented as software, the computer-readable signals defining the method or embodiment may be part of a computer program product, such as a software program written in any of a number of languages such as, for example, C, C++ or Java.

Having now described some illustrative embodiments, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method Acts or apparatus elements, it should be understood that those Acts and those elements may be combined in other ways to accomplish the same objectives. Acts, elements and features discussed only in connection with one embodiment are not intended to be excluded from a similar role in other embodiments.

What is claimed is:

1. For a population of entities, a method of determining a personalized ratee reputation of a first entity from the perspective of a second entity associated with the first entity by one or more rating paths, wherein a rating path comprises one or more rating links, each rating link defining a rating of a rated entity provided by a rating entity, wherein each rating path has a length defined as a number of rating links comprised in the path, and each entity comprised on one of the rating paths has a level defined as a number of rating links between the entity and the second entity, the method comprising computer-implemented acts of:

(A) performing a breadth-first search beginning at the second entity to determine, from the one or more rating paths, one or more first rating paths that have a first length equal to a shortest length between the first entity and the second entity;

(B) for each determined first rating path, identifying a third entity on the first rating path that has a level equal to one less than the first length;

(C) for each identified third entity, determining a first rating of the first entity provided by the third entity;

(D) combining the first ratings to produce a combined rating; and (E) producing the personalized ratee reputation by weighting the combined rating by an amount according to the first length.

2. The method of claim 1, wherein act (D) comprises calculating an average of the first ratings.

3. The method of claim 2, wherein calculating the average comprises, for each first rating, weighting the first rating as a function of a personalized ratee reputation of the corresponding third entity from the perspective of the second entity, the weighting being relative to personalized ratee reputations of the other third entities from the perspective of the second entity.

4. The method of claim 3, further comprising an act of:

(F) for each third entity, determining the personalized ratee reputation of the third entity from the perspective of the second entity, comprising:

(1) determining one or more fourth entities that are on one of the first rating paths, that have provided a second rating of the third entity and that have a level equal to one less than the level of the third entity; and (2) combining the second ratings to produce the personalized ratee reputation of the third entity from the perspective of the second entity.

5. The method of claim 4, wherein act (F)(2) further comprises, for each third entity, calculating an average of the second ratings to determine the personalized ratee reputation of the third entity from the perspective of the second entity.

6. The method of claim 1, further comprising acts of:

(F) for each identified third entity, determining if the third entity has provided more than one rating of the first entity; and (G) for each third entity determined to have provided more than one rating of the first entity, selecting a most recent rating of the more than one ratings as the first rating of the first entity provided by the third entity.

7. The method of claim 1, further comprising an act:

(F) determining whether to transact with the first entity based at least in part on the personalized ratee reputation of the first entity from the perspective of the second entity.

8. The method of claim 1, further comprising an act of:

(F) determining a price to pay for a good or service of the first entity based at least in part on the personalized ratee reputation of the first entity from the perspective of the second entity.

9. The method of claim 1, further comprising an act of:

(F) determining a price to pay for insuring a quality of a good or service of the first entity based at least in part on the personalized ratee reputation of the first entity from the perspective of the second entity.

10. A system for determining, in a population of entities, a personalized ratee reputation of a first entity from the perspective of a second entity associated with the first entity by one or more rating paths, wherein a rating path comprises one or more rating links, each rating link defining a rating of a rated entity provided by a rating entity, wherein each rating path has a length defined as a number of rating links comprised in the path, and each entity comprised on one of the rating paths has a level defined as a number of rating links between the entity and the second entity, the system comprising:

a path-searching module to receive as input an indication of the first entity and an indication of the second entity, to perform a breadth-first search beginning at the second entity to determine, from the one or more rating paths, one or more first rating paths that have a first length equal to a shortest length between the first entity and the second entity, and to provide as output an indication of the one or more first rating paths;

a first look-up module to receive as input the indication of the one or more first rating paths, to identify, for each determined first rating path, a third entity on the first rating path that has a level equal to one less than the first length, and to provide as output an indication of the one or more third entities;

a second look-up module to receive as input the indication of the first entity and the indication of the one or more third entities, to determine, for each third entity, a first rating of the first entity provided by the third entity, and to provide as output the first ratings; and a ratings combining module, to receive as input the first ratings, to generate the personalized ratee reputation by combining the first ratings to produce a combined rating and weighting the combined rating by an amount according to the first length, and to provide as output the personalized ratee reputation.

11. The system of claim 10, wherein the ratings combining module is further operative to calculate an average of the first ratings.

12. The system of claim 11, wherein the ratings combining module is further operative, for each first rating, to weight the first rating as a function of a personalized ratee reputation of the corresponding third entity from the perspective of the second entity, the weighting being relative to personalized ratee reputations of the other third entities from the perspective of the second entity.

13. The system of claim 12, wherein the personalized reputation generator is further operative to determine, for each third entity, the personalized ratee reputation of the third entity from the perspective of the second entity, and further comprises:

a processing module to receive as input an indication of the one or more first rating paths and an indication of the one or more third entities, to determine, for each third entity, one or more fourth entities that are on one of the first rating paths, that have provided a second rating of the third entity and that have a level equal to one less than the level of the third entity, and to output an indication of the second ratings, and wherein the ratings combining module is further operative to receive the indication of the second ratings, and to combine the second ratings to produce the personalized ratee reputation of the third entity from the perspective of the second entity.

14. The system of claim 13, wherein, for each third entity, to determine the personalized ratee reputation of the third entity from the perspective of the second entity, the ratings combining module is further operative to calculate an average of the second ratings.

15. The system of claim 10, wherein the second look-up module is operative to, for each identified third entity, determine if the third entity has provided more than one rating of the first entity, and for each third entity determined to have provided more than one rating of the first entity, to select a most recent rating of the more than one ratings as the first rating of the first entity provided by the third entity.

16. The system of claim 10, wherein the system further comprises:
   a transaction module that receives the determined personalized ratee reputation, determines whether to transact with the first entity based at least in part on the personalized ratee reputation of the first entity from the perspective of the second entity, and outputs an indication of whether or not to transact with the first entity.

17. The system of claim 10, wherein the personalized reputation generator is connected to a transaction module that receives the determined personalized ratee reputation, determines a price to pay for a good or service of the first entity based at least in part on the personalized ratee reputation of the first entity from the perspective of the second entity, and outputs an indication of the price.

18. The system of claim 10, wherein the system further comprises
   a transaction module that receives the determined personalized ratee reputation, determines for insuring a quality of a good or service of the first entity based at least in part on the personalized ratee reputation of the first entity from the perspective of the second entity, and outputs an indication of the price.

19. For a population of entities, a system for determining a personalized ratee reputation of a first entity from the perspective of a second entity associated with the first entity by one or more rating paths, wherein a rating path comprises one or more rating links, each rating link defining a rating of a rated entity provided by a rating entity, wherein each rating path has a length defined as a number of rating links comprised in the path, and each entity comprised on one of the rating paths has a level defined as a number of rating links between the entity and the second entity, the system comprising:
   means for performing a breadth-first search beginning at the second entity to determine, from the one or more rating paths, one or more first rating paths that have a first length equal to a shortest length between the first entity and the second entity;
   means for identifying, for each determined first rating path, a third entity on the first rating path that has a level equal to one less than the first length;
   means for determining, for each identified third entity, a first rating of the first entity provided by the third entity;
   means for combining the first ratings to produce a combined rating; and
   means for producing the personalized ratee reputation by weighting the combined rating by an amount according to the first length.

20. A computer program product comprising:
   a computer readable medium; and
   computer readable signals stored on the computer readable medium that define instructions that, as a result of being executed by a computer, instruct the computer to perform, for a population of entities, a method of determining a personalized ratee reputation of a first entity from the perspective of a second entity associated with the first entity by one or more rating paths, wherein a rating path comprises one or more rating links, each rating link defining a rating of a rated entity provided by a rating entity, wherein each rating path has a length defined as a number of rating links comprised in the path, and each entity comprised on one of the rating paths has a level defined as a number of rating links between the entity and the second entity, the method comprising acts of:
   (A) performing a breadth-first search beginning at the second entity to determine, from the one or more rating paths, one or more first rating paths that have a first length equal to a shortest length between the first entity and the second entity;
   (B) for each determined first rating path, identifying a third entity on the first rating path that has a level equal to one less than the first length;
   (C) for each identified third entity, determining a first rating of the first entity provided by the third entity;
   (D) combining the first ratings to produce a combined rating; and
   (E) producing the personalized ratee reputation by weighting the combined rating by an amount according to the first length.

21. The computer program product of claim 20, wherein act (D) comprises calculating an average of the first ratings.

22. The computer program product of claim 21, wherein calculating the average comprises, for each first rating, weighting the first rating as a function of a personalized ratee reputation of the corresponding third entity from the perspective of the second entity, the weighting being relative to personalized ratee reputations of the other third entities from the perspective of the second entity.

23. The computer program product of claim 22, wherein the method further comprises an act of:
   (F) for each third entity, determining the personalized ratee reputation of the third entity from the perspective of the second entity, comprising:
     (1) determining one or more fourth entities that are on one of the first rating paths, that have provided a second rating of the third entity and that have a level equal to one less than the level of the third entity; and
     (2) combining the second ratings to produce the personalized ratee reputation of the third entity from the perspective of the second entity.

24. The computer program product of claim 23, wherein act (F)(2) further comprises, for each third entity, calculating an average of the second ratings to determine the personalized ratee reputation of the third entity from the perspective of the second entity.

25. The computer program product of claim 20, wherein the method further comprises acts of:
   (F) for each identified third entity, determining if the third entity has provided more than one rating of the first entity; and
   (G) for each third entity determined to have provided more than one rating of the first entity, selecting a most recent rating of the more than one ratings as the first rating of the first entity provided by the third entity.

26. The computer program product of claim 20, wherein the method further comprises an act:

(F) determining whether to transact with the first entity based at least in part on the personalized ratee reputation of the first entity from the perspective of the second entity.

27. The computer program product of claim 20, wherein the method further comprises an act of:

(F) determining a price to pay for a good or service of the first entity based at least in part on the personalized ratee reputation of the first entity from the perspective of the second entity.

28. The computer program product of claim 20, wherein the method further comprises an act of:

(F) determining a price to pay for insuring a quality of a good or service of the first entity based at least in part on the personalized ratee reputation of the first entity from the perspective of the second entity.

* * * * *